US011137045B2

(12) United States Patent
Gandhi et al.

(10) Patent No.: US 11,137,045 B2
(45) Date of Patent: Oct. 5, 2021

(54) VIBRATION ISOLATOR WITH SERIES AND/OR PARALLEL CONICAL DISC SPRING MEMBER ARRANGEMENTS

(71) Applicant: Toyota Motor Engineering & Manufacturing North America, Inc., Erlanger, KY (US)

(72) Inventors: Umesh N. Gandhi, Farmington Hills, MI (US); Ryohei Tsuruta, Ann Arbor, MI (US); Brian J. Pinkelman, Ann Arbor, MI (US); Rajendra Singh, Dublin, OH (US); Nicholas P. Mastricola, Columbus, OH (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 385 days.

(21) Appl. No.: 15/841,978

(22) Filed: Dec. 14, 2017

(65) Prior Publication Data

US 2019/0186589 A1 Jun. 20, 2019

(51) Int. Cl.
*F16F 15/12* (2006.01)
*F16F 3/02* (2006.01)
(Continued)

(52) U.S. Cl.
CPC .......... *F16F 15/12353* (2013.01); *F16F 1/32* (2013.01); *F16F 3/02* (2013.01); *F16F 2228/004* (2013.01); *F16F 2228/063* (2013.01)

(58) Field of Classification Search
CPC ........... F16F 15/12353; F16F 2228/004; F16F 2228/063; F16F 1/32; F16F 3/02
(Continued)

(56) References Cited

U.S. PATENT DOCUMENTS 82,276 A * 9/1868 Belleville ................. F23N 3/06 236/26 B
1,826,597 A * 10/1931 Brecht ...................... F16F 1/32 267/162

(Continued)

FOREIGN PATENT DOCUMENTS

CN 202811955 3/2013
JP 2011201378 10/2011

OTHER PUBLICATIONS

Le, Thanh Danh & Ahn, Kyoung Kwan, "A vibration isolation system in low frequency excitation region using negative stiffness structure for vehicle seat", Journal of Sound and Vibration 330 ( 2011) 6311-6335.

(Continued)

*Primary Examiner* — Robert A. Siconolfi
*Assistant Examiner* — James K Hsiao
(74) *Attorney, Agent, or Firm* — Christopher G. Darrow; Darrow Mustafa PC

(57) ABSTRACT

An energy-absorbing structure for a vibration isolator includes a conical disc spring member having a first end including a central opening and a second end opposite the first end. The structure also includes at least one spacer having a base portion with a first side. The base portion first side defines a cavity structured to receive therein a second end of the spring member. The cavity has a floor, and a second end of the spring member is positioned in contact with the floor. The floor includes an opening formed therein and positioned so as to reside opposite the first end of the spring member when the second end of the spring member is positioned in contact with the cavity floor. The opening is structured to receive at least a portion of the first end of the spring member therein during an inversion of the spring member.

16 Claims, 16 Drawing Sheets

(51) Int. Cl.
*F16F 1/32* (2006.01)
*F16F 15/123* (2006.01)

(58) Field of Classification Search
USPC .................................................. 267/161, 162
See application file for complete search history.

(56) References Cited

U.S. PATENT DOCUMENTS

| | | | | |
|---|---|---|---|---|
| 2,121,835 | A * | 6/1938 | Sproul | B61F 5/122 267/207 |
| 2,655,935 | A * | 10/1953 | Kinzbach | F16F 1/32 137/538 |
| 2,991,655 | A * | 7/1961 | Jorgensen | H01H 35/10 73/537 |
| 3,394,631 | A * | 7/1968 | Thompson | F16F 3/02 92/46 |
| 3,743,266 | A * | 7/1973 | Sturman | B60R 19/28 267/31 |
| 3,836,195 | A * | 9/1974 | Teeri | F16F 1/32 267/162 |
| 3,856,242 | A * | 12/1974 | Cook | F16F 15/06 248/548 |
| 3,858,665 | A * | 1/1975 | Winker | E02F 3/8157 172/816 |
| 3,873,079 | A * | 3/1975 | Kuus | F16F 1/32 267/162 |
| 3,980,016 | A * | 9/1976 | Taylor | B30B 15/061 100/295 |
| 4,168,101 | A | 9/1979 | DiGrande | |
| 4,215,841 | A | 8/1980 | Herring, Jr. | |
| 4,351,556 | A | 9/1982 | Worringer | |
| 4,457,213 | A * | 7/1984 | Morgan | F16J 3/047 228/182 |
| 4,530,491 | A | 7/1985 | Bucksbee et al. | |
| 4,612,429 | A * | 9/1986 | Milianowicz | F16F 7/00 200/288 |
| 4,799,654 | A * | 1/1989 | Eickmann | F04B 43/0063 267/162 |
| 4,824,338 | A * | 4/1989 | Eickmann | B64C 29/00 417/472 |
| 5,178,357 | A * | 1/1993 | Platus | F16F 3/026 248/619 |
| 5,222,709 | A | 6/1993 | Culley, Jr. et al. | |
| 5,390,903 | A * | 2/1995 | Fidziukiewicz | F16F 1/32 267/162 |
| 5,669,598 | A * | 9/1997 | Ticey | F16F 1/32 267/162 |
| 6,939,097 | B2 * | 9/2005 | Carr | F16B 43/00 411/155 |
| 7,152,839 | B2 | 12/2006 | Mullinix et al. | |
| 8,166,626 | B2 * | 5/2012 | Sereni | F16F 1/32 29/229 |
| 8,185,988 | B2 * | 5/2012 | Wieland | A47C 23/05 5/247 |
| 8,366,082 | B2 * | 2/2013 | Evans | F16F 1/32 267/162 |
| 8,919,751 | B2 * | 12/2014 | Kneidel | F16D 13/68 267/162 |
| 9,408,428 | B2 * | 8/2016 | Gaudet | F16F 9/103 |
| 2012/0018577 | A1 * | 1/2012 | Quiroz-Hernandez | B64D 27/26 244/54 |
| 2015/0298580 | A1 * | 10/2015 | Kanai | B60N 2/0715 248/430 |
| 2016/0068085 | A1 | 3/2016 | Mindel et al. | |
| 2018/0312086 | A1 * | 11/2018 | Meingast | B60N 2/7094 |
| 2019/0186588 | A1 * | 6/2019 | Gandhi | F16F 15/12353 |

OTHER PUBLICATIONS

Lee, C.M. & Goverdovskiy, V.N., “A multi-stage high-speed railroad vibration isolation system with “negative” stiffness”, Journal of Sound and Vibration 331 (2012) 914-921.

Lee, et al., “Position control of seat suspension with minimum stiffness”, Journal of Sound and Vibration 292 (2006) 435-442.

Carella et al., “Demonstrator to show the effects of negative stiffness on the natural frequency of a simple oscillator”, JMES (2008) Proceedings of the Institution of Mechanical Engineers, Part C: Journal of Mechanical Engineering Science, vol. 222 (7), pp. 1189-1192.

Le, Thanh Dahn & Ahn, Kyoung Kwan “Experimental investigation of a vibration isolation system using negative stiffness structure”, International Journal of Mechanical Sciences (2013) International Journal of Mechanical Sciences 70 (2013) 99-112.

* cited by examiner

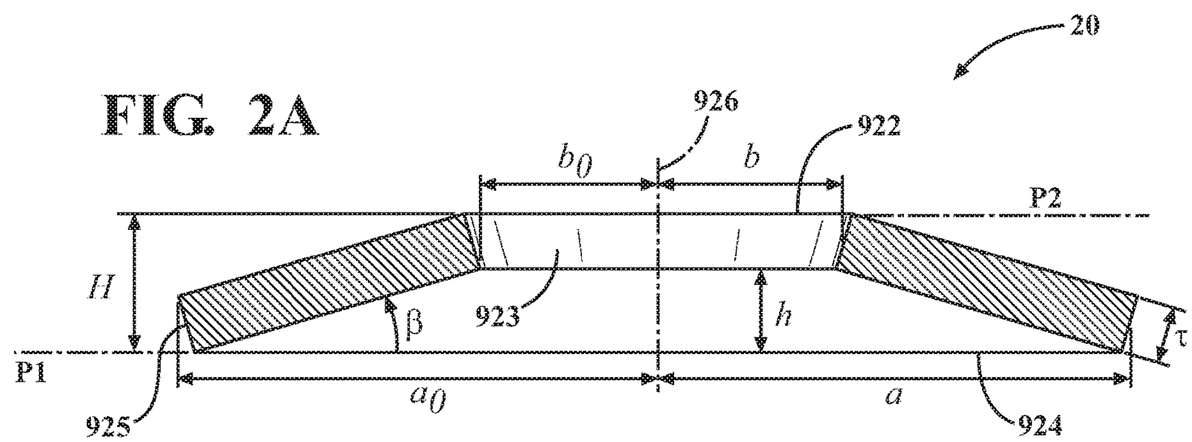
FIG. 2A
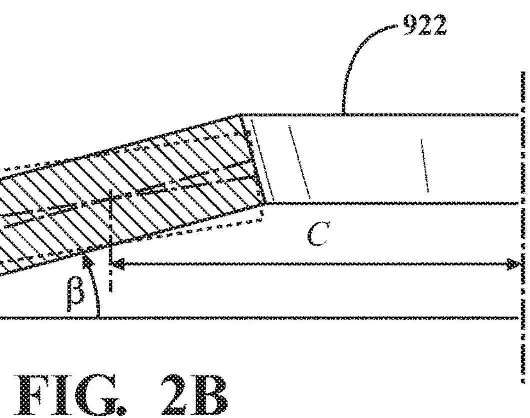
FIG. 2B
FIG. 2C
| Symbol | Standard Parameters |
|---|---|
| $a_0$ | Outer radius |
| $b_0$ | Inner radius |
| $H$ | Spring Height |
| $\tau$ | Shell thickness |
| Symbol | Standard Parameters |
|---|---|
| $a$ | Mid-surface outer radius |
| $b$ | Mid-surface inner radius |
| $c$ | Neutral circle redius |
| $h$ | Initial cone height |
| $\beta$ | Initial cone angle |
| $\varphi$ | Rotational deflection |
| $\delta$ | Linear deflection |

VIBRATION ISOLATOR WITH SERIES AND/OR PARALLEL CONICAL DISC SPRING MEMBER ARRANGEMENTS

TECHNICAL FIELD

The present invention relates to systems and mechanisms in vehicles for preventing transmission of vibrations and forces causing vibrations from one portion of a vehicle to another portion of the vehicle.

BACKGROUND

It has been found that low frequency vibrations (in the range 0-10 Hz) experienced by a vehicle traveling along a road surface can be especially irritating to vehicle occupants. Forces resulting from these vibrations may be transmitted from the vehicle chassis to seats where the occupants are sitting. It can be difficult to isolate the passenger seats from these vibrations. Currently-used methods of isolating vehicle seats from such vibrations may be complex and expensive.

SUMMARY

In one aspect of the embodiments described herein, an energy-absorbing structure for a vibration isolator is provided. The structure includes a first conical disc spring member having a first end including a central opening of the first conical disc spring member, and a second end opposite the first end. The first conical disc spring member also has a central axis. The structure also includes at least one first spacer including a base portion having a first side. The base portion first side defines a first cavity structured to receive therein a second end of the first conical disc spring member. The first cavity has a first cavity floor, and a second end of the first conical disc spring member is positioned in contact with the first cavity floor. The first cavity floor includes a first opening formed therein and positioned so as to reside opposite a first end of the first conical disc spring member when the second end of the first conical disc spring member is positioned in contact with the first cavity floor. The first opening is structured to receive at least a portion of a first end of the first conical disc spring member therein during an inversion of the first conical disc spring member during loading of the first conical disc spring member.

In another aspect of the embodiments described herein, a vibration isolator is provided. The vibration isolator includes a spacer having a base portion with a first side and a second side opposite the first side. The base portion first side has at least one cavity structured to receive therein a portion of a first conical disc spring member. At least one projection extends from the second side and is structured to engage a portion of a second conical disc spring member so as to enable application of a force to the second conical disc spring member using the at least one projection.

In another aspect of the embodiments described herein, a vibration isolator is provided. The vibration isolator includes a housing having a first end and at least one force application member coupled to the housing so as to be movable with respect to the housing. The at least one force application member extends from an interior of the housing to an exterior of the housing. At least one first conical disc spring member is positioned in the housing interior and is coupled to the at least one force application member so as to enable transfer of a force between the at least one force application member and the at least one first conical disc spring member.

A spacer is positioned in the housing interior, the spacer being coupled to the at least one first conical disc spring member so as to enable transfer of a force between the at least one first conical disc spring member and the spacer. At least one second conical disc spring member is positioned in the housing interior and is coupled to the spacer so as to enable transfer of a force between the spacer and the at least one second conical disc spring member. A first additional spacer is positioned in the housing interior. The first additional spacer is coupled to the at least one second conical disc spring member so as to enable transfer of a force between the at least one second conical disc spring member and the first additional spacer.

BRIEF DESCRIPTION OF THE DRAWINGS

FIG. 2A is a schematic cross-sectional view of a conical disc spring member in accordance with an embodiment described herein, showing various physical dimensions of the spring member.

FIG. 2B is a portion of the schematic cross-sectional view of FIG. 2A showing deflection of the conical disc spring member under application of a load.

FIG. 2C shows definitions of the design dimensions shown in FIGS. 2A and 2B.

DETAILED DESCRIPTION

Embodiments described herein relate to a vibration isolator mechanism for limiting transfer of vibrations from a first element to a second element coupled to the first element. In one example, the first element may be a chassis of a vehicle and the second element may be a seat assembly of the vehicle. The vibration isolator mechanism may include a vibration isolator structured to provide a quasi-zero/negative stiffness response to a force applied to the vibration isolator when the applied force is within a predetermined range. When the force applied to the vibration isolator is within the predetermined range, the quasi-zero/negative stiffness response of the isolator may act to attenuate or severely limit transmission of the vibration forces from the first element to the second element. In one or more arrangements, the vibration isolator includes a plurality of conical disc spring members, and a plurality of spacers separating each pair of adjacent spring members. The spacers are structured to enable inversion of the conical disc spring members during loading. Enabling the conical disc spring member to invert may increase the range of the quasi-zero/negative stiffness response in reaction to the applied force.

Figure 1:
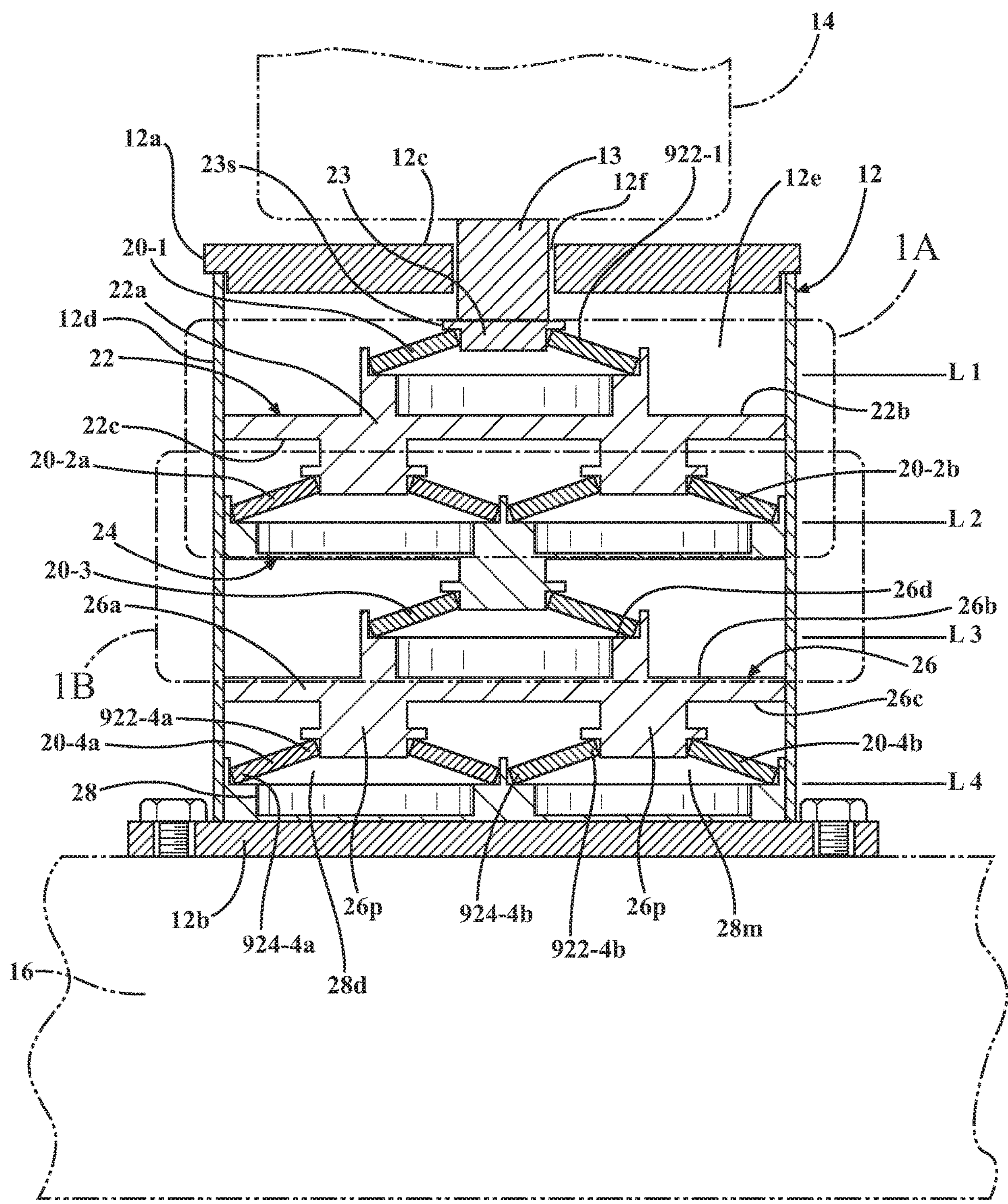
FIG. 1 is a schematic cross-sectional view of a vibration isolator in accordance with an embodiment described herein.

FIG. 1 is a schematic cross-sectional view of a vibration isolator (generally designated 12) in accordance with an embodiment described herein. The vibration isolator 12 may be interposed between elements of a system or mechanism to vibrationally isolate the elements from each other, so that transmission of vibrations experienced by a first element of the system or mechanism to a second element of the system or mechanism are attenuated or eliminated. For example, in the embodiment shown in FIG. 1, the vibration isolator 12 is coupled to a vehicle (not shown) so as to help isolate a second element 14 (for example, a vehicle seat assembly) from vibrations experienced by a first element 16 (for example, a vehicle chassis) during movement of the vehicle along a road surface. However, design particulars of a vibration isolator structure described herein may be adapted to isolate or insulate numerous types of mounted mechanisms or elements from vibrations experienced by mounting structures to which the mounted mechanisms or elements are mounted or attached.

Referring to FIG. 1, in one or more arrangements, the vibration isolator 12 may include a housing 12*a* having a first end 12*b* and a second end 12*c* positioned opposite the first end 12*b*. At least one wall 12*d* may extend between the first and second ends 12*b*, 12*c*. The housing first end 12*b*, second end 12*c*, and the wall(s) 12*d* may combine to define an interior 12*e* of the housing. Housing 12*a* may contain the deflectable and movable components (such as conical disc spring members 20 and spacers 22, 24, 26, 28 described below) forming the various energy-absorbing structures described herein, and provides a structure which is positionable and securable between the first and second elements 16, 14 to perform the vibration isolation function. Each combination of conical disc spring members and spacers inside a housing in a given embodiment of the vibration isolator forms an associated energy-absorbing structure incorporated into the housing.

One or more force application members 13 may be coupled to the housing 12*a* so as to be movable with respect to the housing 12*a*. The force application member(s) 13 may extend from the interior 12*e* of the housing 12*a* to an exterior of the housing 12*a*, for example through a hole 12*f* formed in housing second end 12*c*. The force application member(s) 13 may enable forces to be transferred between elements (such as a vehicle seat assembly 14) located exterior of the housing to the energy-absorbing structure located in the housing interior 12*e*. As shown in FIG. 1, a force application member 13 may contact a spacer 23 inside the housing. One or more shoulders 23*s* of the spacer 23 may be structured to engage a portion of an associated first conical disc spring member 20-1 adjacent a central opening in a first end of the first conical disc spring member 20-1 as shown in FIG. 1, to enable application of a force to a first end of the first conical disc spring member. Forces may be applied to the spacer 23 via force application member 13 to deflect the conical disc spring members 20. The force application member 13 may be a part of the vibration isolator 12, or the force application member 13 may be incorporated into (or in contact with) an element or mechanism to which the vehicle seat assembly 14 and the vibration isolator 12 is attached or coupled.

Figure 6A:
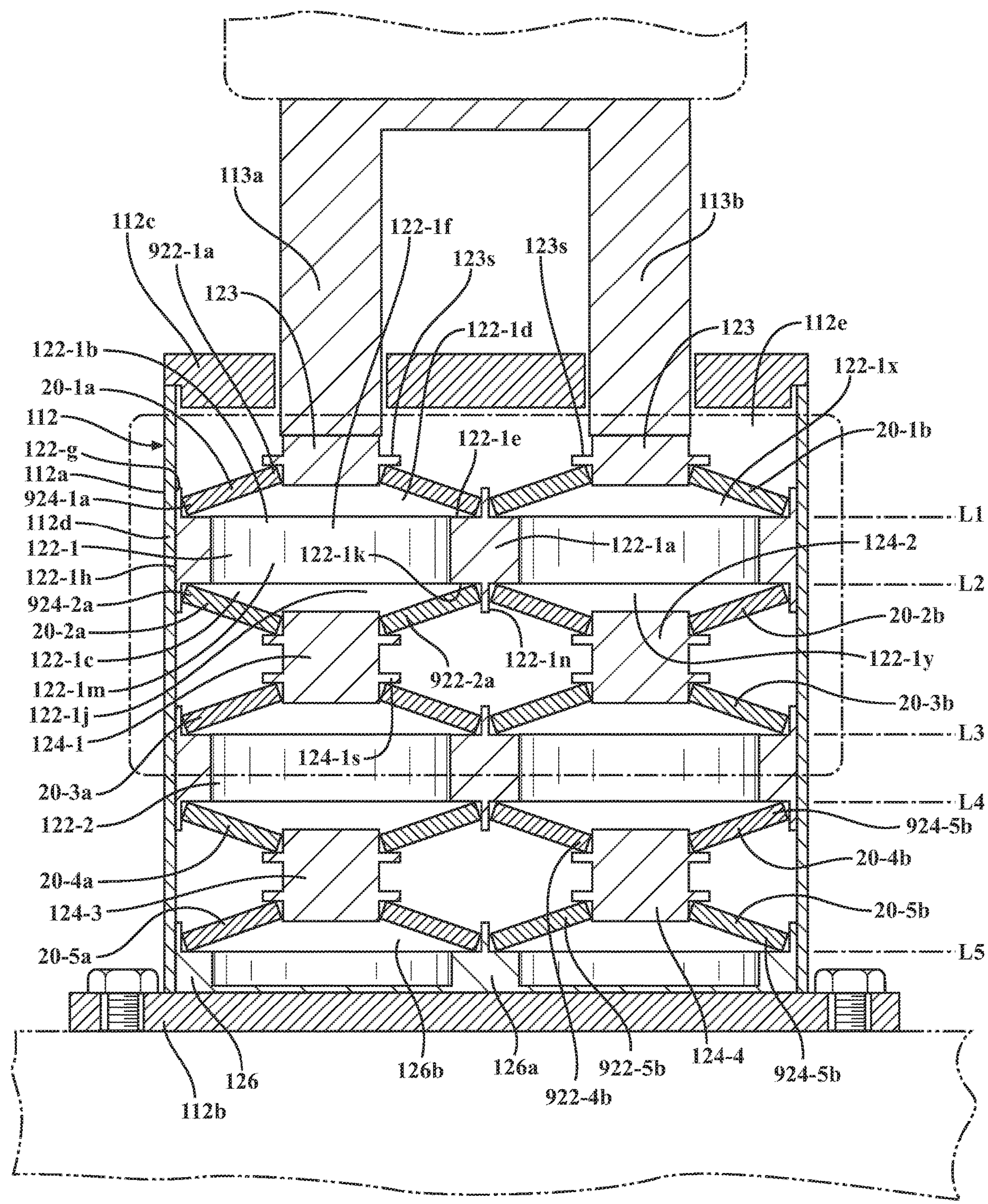
FIG. 6A is a schematic cross-sectional view of a vibration isolator in accordance with another embodiment described herein.

In one or more arrangements, multiple force application members may be provided as seen in the embodiment shown in FIG. 6A, for example, to enable forces to be transferred to the energy-absorbing structured contained within a vibration isolator housing at multiple locations. The embodiment in FIG. 6A shows a pair of force application members 113*a* and 113*b*, with each force application member engaging a separate conical disc spring member.

Referring again to FIG. 1, the vibration isolator 12 may also include a plurality of conical disc spring members, generally designated 20. The conical disc spring members 20 may have the same shape and dimensions, or the conical disc spring members 20 may have different shapes and dimensions. The conical disc spring members 20 shown in FIG. 1 have the same shapes and dimensions.

Referring to FIGS. 1 and 2A-2C, in embodiments described herein, each conical disc spring member 20 is in the shape of a truncated, right circular cone. The general shape in known in the pertinent art in the form of a Belleville washer or conical disc washer, for example. Each conical disc spring member 20 has an associated first end 922 including a central opening 923 of the conical disc spring member 20, and a second end 924 of the conical disc spring member opposite the first end 922. The second end 924 defines a circular base of the conical structure and includes an outer edge 925 of the conical disc spring member 20. A central axis 926 of each conical disc spring member 20 extends through a center of the central opening 923 and also through a center of the circular base 924. Also, the base 924 extends along a plane P1, and the central opening 923 extends along a plane P2 (which truncates the conical structure) parallel to the plane P1, with the central axis 926 extending perpendicular to plane P1 and also extending perpendicular to plane P2.

Conical disc spring members 20 may be in the form of Belleville washers or similar structures designed or selected in accordance with the design parameters and considerations described herein, so as to provide the desired force-deflection characteristics. As is known, such structures act as spring members when a load is applied at either or both of the first end and the second end of the conical disc spring members, where the applied loading acts to deflect one of the first end 922 and the second end 924 in a direction toward the other of the first end 922 and the second end 924.

Referring again to FIG. 1, in the embodiment shown, at least one first conical disc spring member 20-1 may be positioned in the housing 12*a* in an associated first layer L1 of conical disc spring member(s). FIG. 1 shows an embodiment with a single first conical disc spring member 20-1 positioned in the first layer L1. However, a first layer L1 of first conical disc spring members 20-1 may alternatively include multiple first conical disc spring members 20-1 (for example, as shown in the embodiment of FIG. 6A). Each first conical disc spring member 20-1 may be coupled to an associated force application member 13 so as to enable transfer of forces between the force application member 13 and the first conical disc spring member 20-1.

For purposes described herein, two spring members are understood to reside adjacent each other when the spring members are positioned immediately next to each other, with no additional spring member between the two spring members.

A spacer may be interposed between adjacent conical disc spring members on different levels. The spacer may be structured to engage each conical disc spring member so as to maintain a predetermined spacing between portions of the adjacent conical disc spring members during loading of the conical disc spring members. In a manner described herein, use of the spacer may also increase the deflection which may be achieved by the vibration isolator assembly during loading, by providing space for the conical disc spring members in the isolator assembly to flatten and invert under loading, as shown in FIGS. 4B-4D, for example. Each embodiment of a spacer described herein may operate to help space apart and/or maintain alignment and other spatial relationships between any conical disc spring members in contact with the spacer. The conical disc spring member spacers may include features (such as walls 24*g* and 24*k* described below) which help maintain coaxial alignment of the spring members during loading of the vibration isolator.

The various spacers described herein may be designed and dimensioned so as not to interfere with axial movement of the spacers with respect to each other, and may also be designed so as to not interfere with deflection and inversion of any of the conical disc spring members.

Figure 1A:
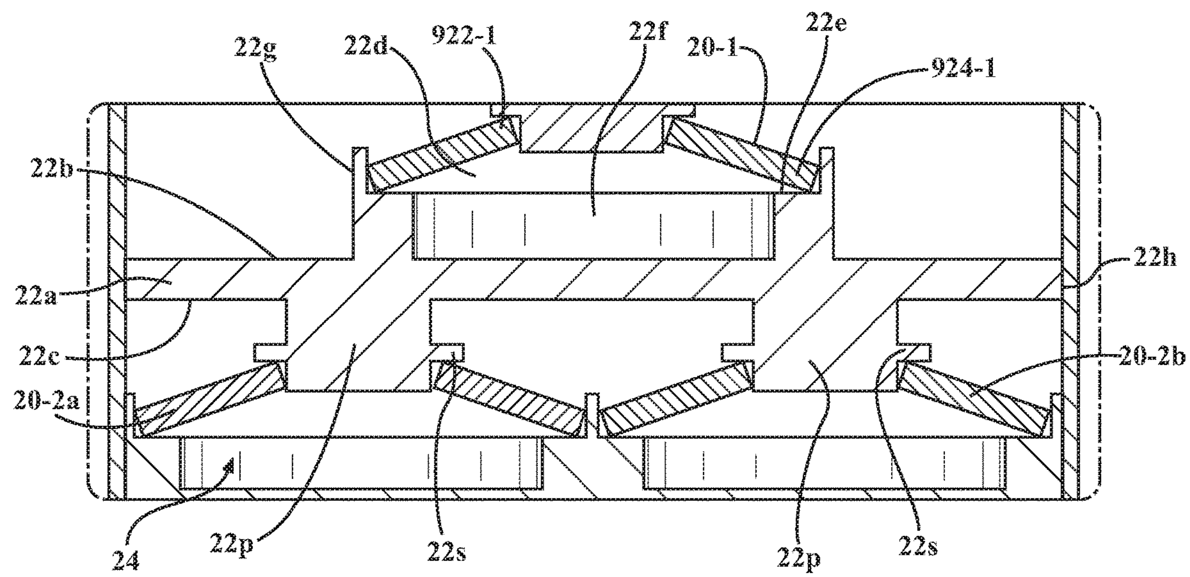
FIG. 1A is a magnified portion of the cross-sectional view shown in FIG. 1.

Referring to FIGS. 1 and 1A, a first spacer 22 may be positioned in the housing interior 12*e*. The first spacer 22 may have a base portion 22*a* with a first side 22*b* and a second side 22*c* opposite the first side 22*b*. The first spacer 22 may be coupled to first conical disc spring member 20-1 along the first spacer base portion first side 22*b* so as to enable transfer of forces between first conical disc spring member 20-1 and the first spacer 22. The base portion first side 22*b* may define a first cavity 22*d* structured to receive therein a second end 924-1 of first conical disc spring member 20-1. First cavity 22*d* may be formed by one or more walls 22*g* extending from the base portion 22*a*. The first cavity 22*d* may have a first cavity floor 22*e*. The second end 924-1 of the first conical disc spring member 20-1 may be positioned in contact with the first cavity floor 22*e*.

The first cavity floor 22*e* may also have a first opening 22*f* formed therein and positioned so as to reside opposite the first conical disc spring member first end 922-1 when the second end 924-1 of the first conical disc spring member 20-1 is positioned in contact with the first cavity floor 22*e*. The first opening 22*f* may be structured to receive at least a portion of the first end 922-1 of the first conical disc spring member 20-1 therein during an inversion of the first conical disc spring member 20-1 during loading of the first conical disc spring member as described herein. The opening 22*f* may lead into a through hole as shown in FIGS. 1 and 1A, or the opening may lead into a blind hole cavity extending into the base portion to a depth sufficient to enable a conical disc spring member 20-1 to deflect into the opening and invert without contacting a bottom of the cavity.

As the second end 924-1 of the conical disc spring member 20-1 (and also the second ends of the other conical disc spring members) deflect radially inwardly and outwardly responsive to an axial loading applied to the vibration isolator, the second end 924-1 and outer edge 925-1 of the conical disc spring member 20-1 may slide radially inwardly and outwardly along the surfaces (such as cavity floor 22*e*) of the spacers with which they are in contact. The first spacer base portion 22*a* may also include an outer edge 22*h* structured to be slidable along and with respect to housing wall(s) 12*d* during movement of the first spacer 22 within the housing 12*a* responsive to loading of the conical disc spring members.

Referring to FIGS. 1 and 1A, at least one second conical disc spring member 20-2 may also be positioned in the housing interior 12*e* in an associated second layer L2 of conical disc spring member(s). In the embodiment shown in FIGS. 1 and 1A, two second conical disc spring members 20-2*a* and 20-2*b* are shown positioned side-by-side in the second layer L2 of conical disc spring member(s). However, the second layer L2 of conical disc spring members 20-2 may alternatively include any other number of second conical disc spring members 20-2.

Second conical disc spring member(s) 20-2 may be coupled to the first spacer 22 along the first spacer base portion second side 22*c* so as to enable transfer of a force between the first spacer 22 and the second conical disc spring member(s) 20-2. In the embodiment shown in FIGS. 1 and 1A, second conical disc spring member(s) 20-2 are coupled to the first spacer 22 along the first spacer base portion second side 22*c* by a pair of projections 22*p* extending from the spacer base portion 22*a* along second side 22*c*. Each of projections 22*p* may include one or more shoulders 22*s* extending therefrom. Each shoulder 22*s* may be structured to engage a portion of an associated one of second conical disc spring members 20-2*a* and 20-2*b* adjacent the respective second conical disc spring member central opening as shown in FIGS. 1 and 1A, to enable application of forces to the first ends of the second conical disc spring members 20-2*a* and 20-2*b* using the associated projections.

Figure 1B:
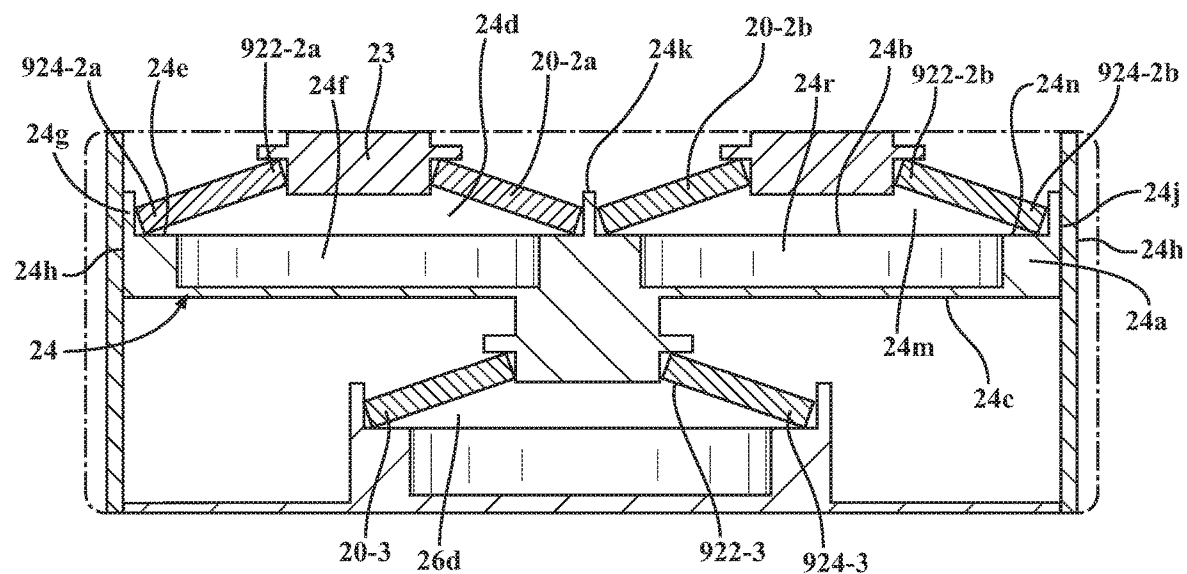
FIG. 1B is another magnified portion of the cross-sectional view shown in FIG. 1.

A second spacer 24 may also be positioned in the housing interior 12*e*. Referring to FIGS. 1 and 1B, second spacer 24 may include a base portion 24*a* having a first side 24*b* and a second side 24*c* opposite the first side. The base portion first side 24*b* may define a first cavity 24*d* structured to receive therein a second end 924-2*a* of second conical disc spring member 20-2*a*, thereby coupling the second conical disc spring member 20-2*a* with the second spacer 24. In the embodiment shown, first cavity 24*d* may be formed by one or more walls 24*g* extending from the base portion 24*a*. The first cavity 24*d* may have a first cavity floor 24*e*. The second end 924-2*a* of second conical disc spring member 20-2*a* may be positioned in contact with the first cavity floor 24*e*. The first cavity floor 24*e* may also have a first opening 24*f* formed therein and positioned so as to reside opposite the first end 922-2*a* second conical disc spring member 20-2*a* when the second end 924 of the second conical disc spring member 20-2*a* is in contact with the first cavity floor 24*e*. The first opening 24*f* may be structured to receive at least a portion of the first end 922-2*a* of the second conical disc spring member 20-2*a* therein during an inversion of the second conical disc spring member 20-2*a* during loading of the second conical disc spring member as described herein.

Also, the base portion first side 24*b* may define a second cavity 24*m* structured to receive therein a second end 924-2*b* of another one 20-2*b* of second conical disc spring members 20-2, thereby coupling the second conical disc spring member 20-2*b* with the second spacer 24. In the embodiment shown, second cavity 24*m* may be formed by one or more walls 24*j* extending from the base portion 24*a*. Cavity 24*m* may be positioned side-by-side with and on the same level (level L2) as cavity 24*d*. The second cavity 24*m* may have a second cavity floor 24*n*. The second end 924-2*b* of the second conical disc spring member 20-2*b* may be positioned in contact with the second cavity floor 24*n*. the second cavity floor 24*n* may also have a second opening 24*r* formed therein and positioned so as to reside opposite the first end 922-2*b* of second conical disc spring member 20-2*b* when the second end 924-2*b* of the second conical disc spring member 20-2*b* is in contact with the second cavity floor 24*n*. The second opening 24*r* may be structured to receive at least a portion of the first end 922-2*b* of the second conical disc spring member 20-2*b* therein during an inversion of the second conical disc spring member 20-2*b* during loading of the second conical disc spring member as described herein. The second spacer 24 may be coupled to each of second conical disc spring members 20-2*a* and 20-2*b* along the second spacer base portion first side 24*b* so as to enable transfer of forces between the conical disc spring members and the second spacer.

Cavities 24*d* and 24*m* may also have one or more shared walls, such as wall 24*k*. The various walls (such as walls 24*g*, 24*j*, 24*k*) extending from the base portions of the spacers and positioned opposite the outer edges of the conical disc spring members may act to restrict lateral movement of the conical disc spring members (i.e., movement along planes perpendicular to the axes of loading of the conical disc spring members), while still permitting full deflection of the conical disc spring member outer edges along the cavity floors so as to enable the conical disc spring members to flatten and invert as described herein. The second spacer base portion 24*a* may also include an outer edge 24*h* structured to be slidable along and with respect to housing wall 12*d* during movement of the second spacer 24 within the housing 12*a* responsive to loading of the conical disc spring members.

In addition, referring to FIGS. 1 and 1B, one or more third conical disc spring members 20-3 may be positioned in the housing interior 12*e* and coupled to the second spacer 24 along the second spacer base portion second side 24*c* so as to enable transfer of forces between the second spacer 24 and the one or more third conical disc spring members 20-3. In the embodiment shown in FIG. 1, a single third conical disc spring member 20-3 is received in a cavity 26*d* formed along a first side 26*b* in a third spacer 26 which has the same structure as first spacer 22 previously described. Also, referring to FIG. 1, at least one fourth conical disc spring member 20-4 may be positioned in the housing interior 12*e* and may be coupled to the third spacer 26 along the second side 26*c* of the third spacer 26 so as to enable transfer of forces between the third spacer 26 and the at least one fourth conical disc spring member 20-4. In the embodiment shown in FIG. 1, a pair of conical disc spring members 20-4*a* and 20-4*b* is coupled to the third spacer 26 by an associated pair of projections 26*p* extending from the second side 26*c* of third spacer base portion 26*a*, in the manner previously described with regard to first spacer 22.

Referring to FIG. 1, a fourth spacer 28 may also be provided at or near the housing first end 12*b*. Fourth spacer 28 may have the same structure as the first side 24*b* of second spacer 24 previously described, and may include first and second cavities 28*d* and 28*m* structured for receiving therein second ends 924-4*a* and 924-4*b* of conical disc spring members 20-4*a* and 20-4*b*, thereby coupling the conical disc spring members 20-4*a* and 20-4*b* with the fourth spacer 28 in the manner previously described, so that forces may be transmitted between the fourth spacer 28 and the conical disc spring members 20-4*a* and 20-4*b*. Fourth spacer 28 may be attached directly to housing first end 12*b* or may be secured to the housing first end such that forces transmitted to the housing will be transmitted directly to the fourth spacer 28, without damping or attenuation. Thus, the fourth spacer 28 may serve as a means for transferring forces acting on housing first end 12*b* to the remainder of the energy-absorbing structure inside the housing.

The vibration isolator structure embodiment in FIG. 1 shows the conical disc spring members arranged in a parallel configuration. For purposes described herein, conical disc spring members are understood to be stacked or arranged in parallel or in a parallel configuration when the conical disc spring members are oriented with respect to each other such that the conical disc spring members have the same orientation within the housing as shown in FIGS. 1-1B (i.e., a repeating sequence of conical disc spring member features encountered when proceeding in a direction from the first end 12*b* toward the housing second end 12*c* may be, for example, a conical disc spring member second end (such as 924-4*a*), then a conical disc spring member first end (such as 922-4*a*), then another conical disc spring member second end (such as 924-3), then another conical disc spring member first end (such as 922-3), etc., in alternating fashion). This arrangement has the general effect of adding spring constants of the conical disc spring members in parallel, resulting in a higher overall spring constant for the vibration isolator. Also, adding additional conical disc spring members also arranged in a parallel with existing conical disc spring members within the vibration isolator may further increase the overall spring constant of the vibration isolator.

Figure 6B:
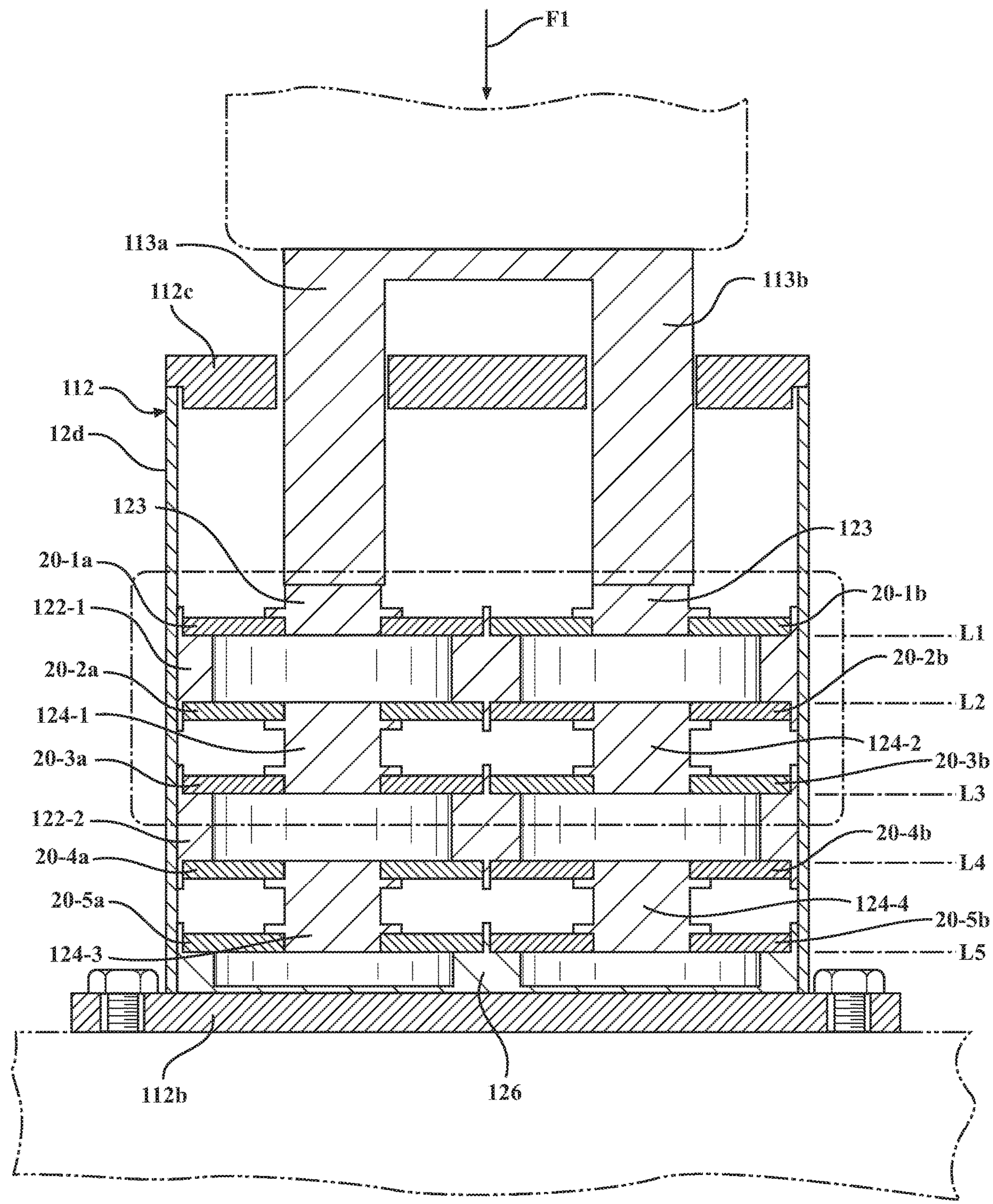
FIG. 6B is the schematic cross-sectional view of FIG. 6A showing the conical disc spring members under application of a load sufficient to provide a quasi-zero/negative stiffness response in the conical disc spring members incorporated into the isolator.
Figure 6C:
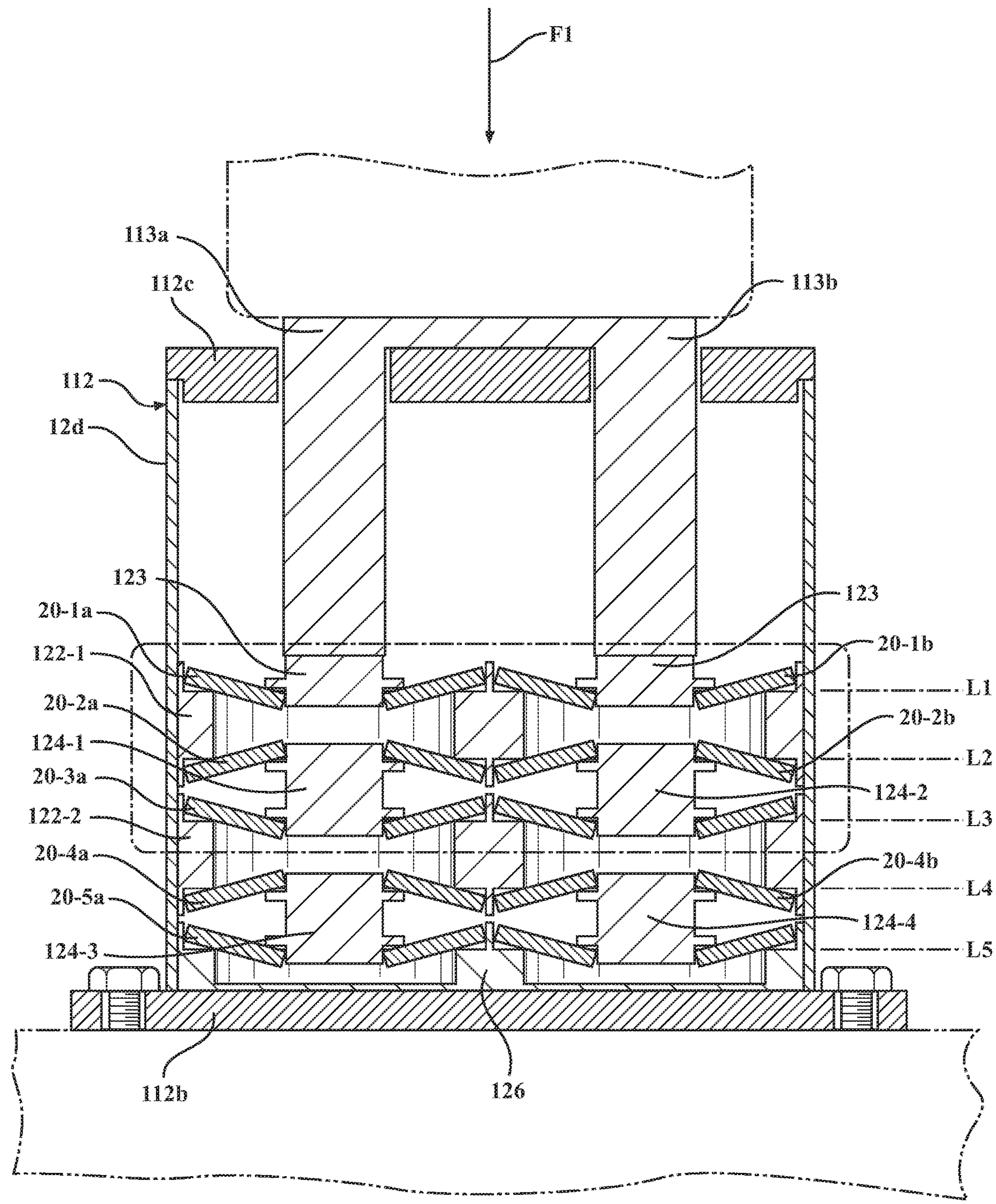
FIG. 6C is a schematic cross-sectional view of the vibration isolator of FIG. 6B, showing the conical disc spring members in an inverted state after a further increase in the loading applied to the vibration isolator.

Two or more of the conical disc spring members of the vibration isolator may alternatively be arranged in a series configuration. The embodiment of FIGS. 6A-6C shows an example of a series arrangement of conical disc spring members. For purposes described herein, conical disc spring members are understood to be stacked or arranged in series or in a series configuration when the conical disc spring members are oriented with respect to each other such that each first end of a conical disc spring member is positioned either in contact with or directly opposite and spaced apart from a first end of an adjacent conical disc spring member, and each second end of a conical disc spring member is positioned either in contact with or directly opposite and spaced apart from a second end of an adjacent conical disc spring member. Thus, referring to FIG. 6A, conical disc spring members in a series configuration will have alternating opposite orientations in the housing (i.e., a repeating sequence of conical disc spring member features of two adjacent conical disc springs encountered when proceeding in a direction from the housing first end 12_b_ toward the housing second end 12_c_ may be a conical disc spring member second end (such as 924-5_b_), then a conical disc spring member first end (such as 922-5_b_), then another conical disc spring member first end (such as 922-4_b_), then another conical disc spring member second end (such as 924-4_b_), etc. in alternating arrangement as shown). Such an arrangement has the general effect of adding spring constants of the conical disc spring members in series, resulting in a lower overall spring constant for the vibration isolator assembly and may also provide a greater available deflection of the vibration isolator energy-absorbing structure. Also, adding additional conical disc spring members coaxially arranged in this manner to the isolator assembly may further reduce the overall spring constant of the isolator assembly.

Figure 3:
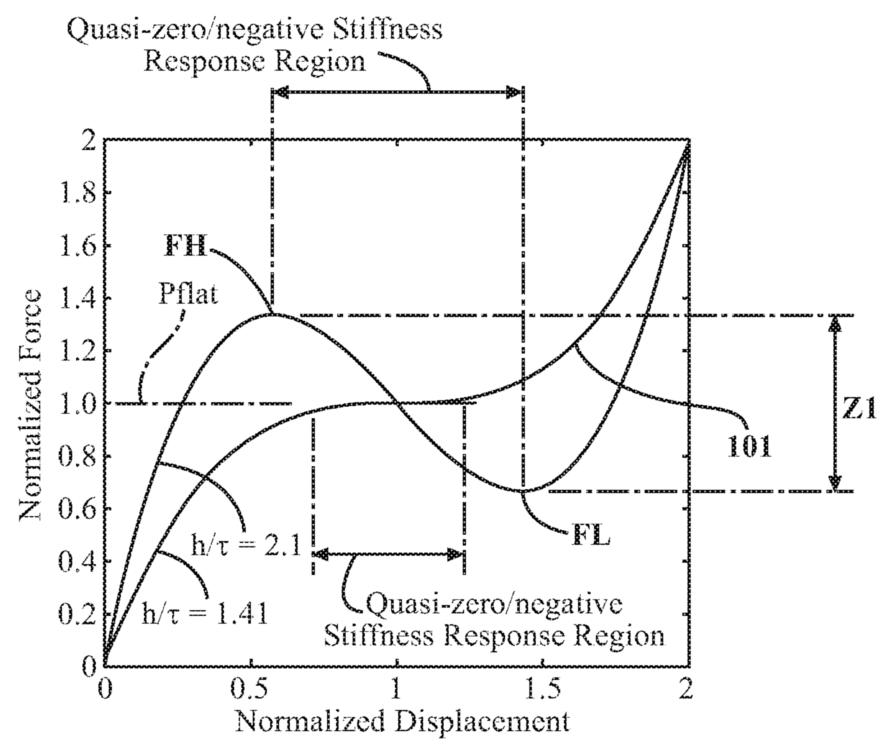
FIG. 3 shows the effect of varying a design parameter $h/\tau$ on a force-deflection curve of a conical disc spring member designed in accordance with an embodiment described herein.

Embodiments of the vibration isolator described herein are structured to provide a quasi-zero/negative stiffness response to a force applied to the vibration isolator when the applied force is within a predetermined range. A conical disc spring member as shown in FIGS. 1 and 2A-2C is known to have non-linear force-deflection characteristics. Various dimensions and design parameters which may be specified for a given design of a conical disc spring member are shown in FIGS. 2A-2C. In one or more arrangements, these dimensions and design parameters may be specified so as to provide a conical disc spring member having a force-deflection curve shaped generally as shown in FIG. 3. The deflection of the conical disc spring member represented in FIG. 3 is a deflection of the one of the first end 922 and the second end 924 toward the other one of the first end 922 and the second end 924 along the central axis 926.

One characteristic of these response curves is a region in which a slope of the curve may be zero, near zero, or negative for a certain applied force $P_{flat}$ (or for a range of applied forces centered about $P_{flat}$), and until the applied force increases to a certain level. This force or range of forces defines a "quasi-zero/negative" stiffness region of the force-deflection curve. In this quasi-zero/negative stiffness region, the conical disc spring member may experience a substantial increase in deflection responsive to little or no increase in the applied force ("quasi-zero" stiffness behavior), or the conical disc spring member may actually experience a temporary reduction in force during continued deflection ("negative" stiffness behavior).

It has been found that, when a force (such as a vibration or impulse load, for example) is applied to the conical disc spring member which produces a response of the spring member in the quasi-zero/negative stiffness region, transmission of the force through the conical disc spring member may be eliminated or substantially attenuated. It has been found possible to provide this quasi-zero/negative stiffness region in a given design of conical disc spring member by tailoring the values of certain design parameters and relationships. For example, FIG. 3 shows the effect on the force-deflection curve of varying the parameter $h/\tau$ (i.e., the ratio of initial cone height h to shell thickness $\tau$ as shown in FIG. 2A. From FIG. 3, it may be seen that a substantially flat or horizontal region of the force-deflection curve 101 may be provided for a certain $h/\tau$ ratio. The force $P_{FLAT}$ at which this quasi-zero/negative stiffness response occurs or begins for a given conical disc spring member design may be determined in terms of h and $\tau$ using the following relationship:

$$P_{Flat} = \frac{\pi E h \tau^3}{a^2}\left(\frac{\alpha+1}{\alpha-1} - \frac{2}{\ln\alpha}\right)\left(\frac{\alpha}{\alpha-1}\right)^2 \tag{1}$$

where the parameter $\alpha$ is equal to the ratio a/b of mid-surface outer radius a to mid-surface inner radius b, as shown in the parameter definitions of FIGS. 2A-2C.

Normalized force-deflection curves for $h/\tau$ ratios of 1.41 and 2.1 are shown in FIG. 3. It may be seen that a substantially flat or horizontal region of the force-deflection curve occurs for the $h/\tau$ ratio of 1.41. Also, as seen in FIG. 3, the curve 311 for an $h/\tau$ ratio of 2.1 exhibits negative stiffness behavior in the middle portion of the curve. All of the conical disc spring member embodiments described herein are designed or selected so as to exhibit a quasi-zero/negative stiffness response region in their respective force-deflection curves. In one or more arrangements, conical disc spring members having $h/\tau$ ratios in the range 1.41 to 2.1 inclusive are used for the purposes described herein. That is, each conical disc spring member incorporated into the vibration isolator is selected or designed so as to have an $h/\tau$ ratio in the range 1.41-2.1 inclusive. Such conical disc spring members have been found to provide force-deflection characteristics suitable for the purposes described herein. In one or more particular arrangements, each conical disc spring member incorporated into the vibration isolator is selected or designed so as to have an $h/\tau$ ratio of 1.41 (or an $h/\tau$ ratio of as close as possible to 1.41) to provide a quasi-zero/negative stiffness response region suitable for the purposes described herein.

It has also been found that similar quasi-zero/negative stiffness response regions may be provided in the force-deflection curves of arrangements of two or more conical disc spring members as described herein, responsive to application of a force of a given magnitude and where each individual conical disc spring member of the arrangement has been selected or designed to provide a quasi-zero/negative stiffness response region as shown in FIG. 3. When subjected to a force in this quasi-zero/negative stiffness region, the entire arrangement of conical disc spring members may experience a substantial increase in deflection responsive to little or no increase in the applied force and/or may experience a temporary reduction in applied force during continued deflection. Deflection of an entire arrangement of conical disc spring members may be defined as the combined axial deflection of all of the conical disc spring members of the arrangement responsive to an applied loading of the arrangement. Thus, for example, the deflection of the arrangement may vary during use and with the cyclic loading imposed by an ongoing vibration load.

In one or more arrangements, for purposes of targeting a level of force F1 to be applied to the vibration isolator to produce the quasi-zero/negative stiffness response (or for purposes of designing a conical disc spring member arrangement which will provide quasi-zero/negative stiffness response for a given applied force), an effective quasi-zero/negative stiffness response zone Z1 may be established. As shown in FIG. 3, for a curve with a $h/\tau$ ratio of closer to 2.1, for example, such a zone Z1 may be bounded by a highest force FH at which the quasi-zero/negative stiffness response for the arrangement of conical disc spring members of the vibration isolator begins, and a lowest force FL at which the quasi-zero/negative stiffness response for the arrangement of conical disc spring members of the vibration isolator ends. In one or more arrangements, for conical member spring and system design purposes, a conical disc spring member arrangement using spring members as shown in FIGS. 2A-2C and designed in accordance with the principles described herein may be assumed to exhibit quasi-zero/negative stiffness behavior in response to applied forces falling within a range of forces defined in this manner. Thus, a vibration isolator exhibiting quasi-zero/negative stiffness behavior in response to applied forces in zone Z1 may be used in a system where this range of applied forces will be encountered. Alternatively, the location of zone Z1 on the force-deflection curves may be tailored so that the isolator will exhibit quasi-zero/negative stiffness behavior in response to a known, predetermined force or target range of applied forces. The effective quasi-zero/negative stiffness response zone Z1 may also be defined in an alternative manner.

It has been found that, when a force of a certain magnitude (such as a vibration or impulse load) is applied to an arrangement of multiple conical disc spring members designed in accordance with the guidelines described above, a response of the arrangement in the quasi-zero/negative stiffness region may be achieved. When the applied forces operate to produce a force-deflection response of the arrangement in the quasi-zero/negative stiffness region, it has been found that transmission of the vibration from the first element to the second element may be eliminated or substantially attenuated. It has also been found that low frequency vibration forces (in the range 0-10 Hz) experienced by a vehicle chassis may be eliminated or substantially attenuated by a vibration isolator mechanism in accordance with an embodiment described herein. The exact force (or forces) at which quasi-zero/negative stiffness regions will be produced in a given vibration isolator design may depend on the particular arrangement of conical disc spring members.

Figure 4A:
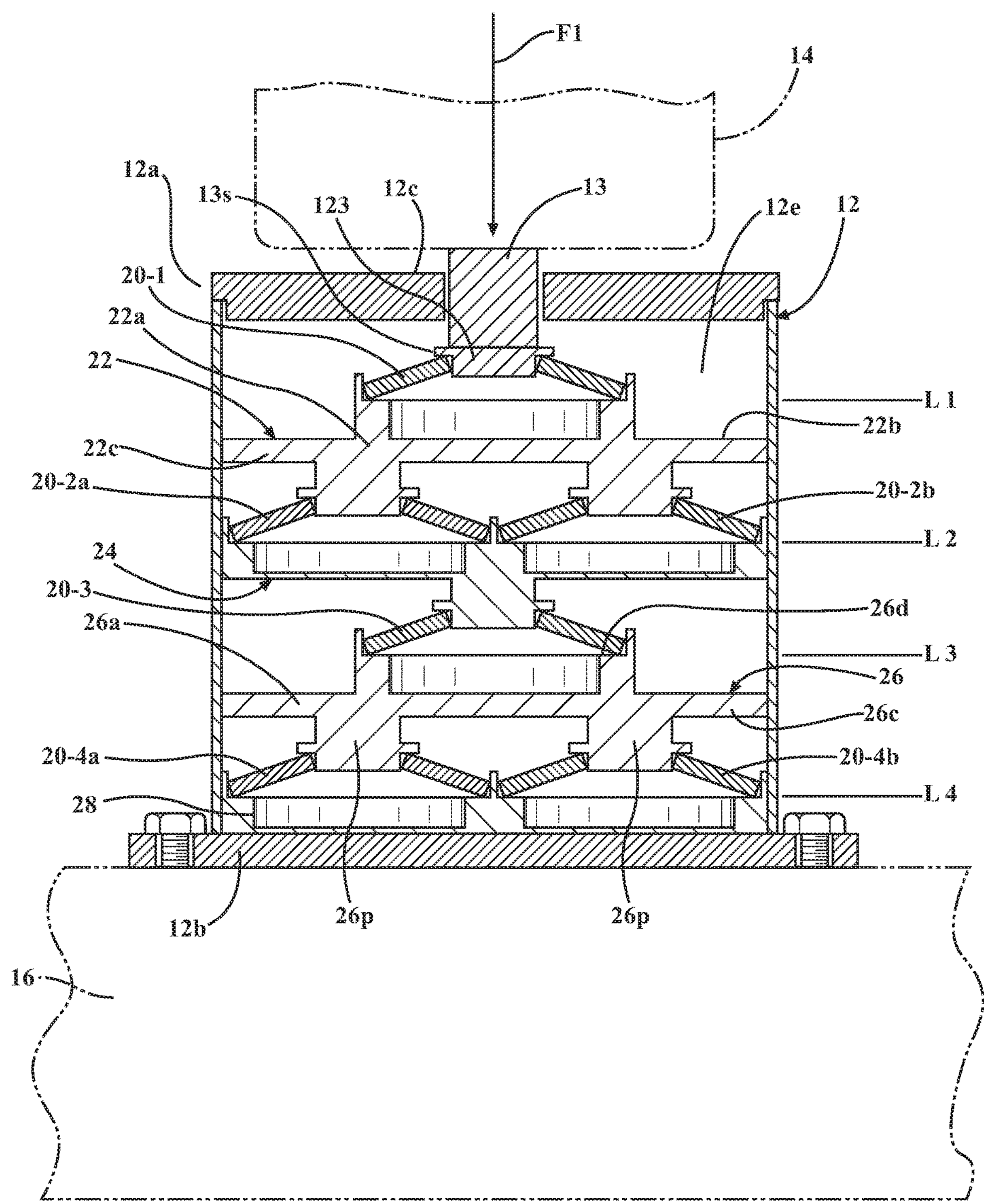
FIG. 4A is a schematic cross-sectional view of the vibration isolator of FIG. 1, showing application of a load to the vibration isolator.
Figure 4B:
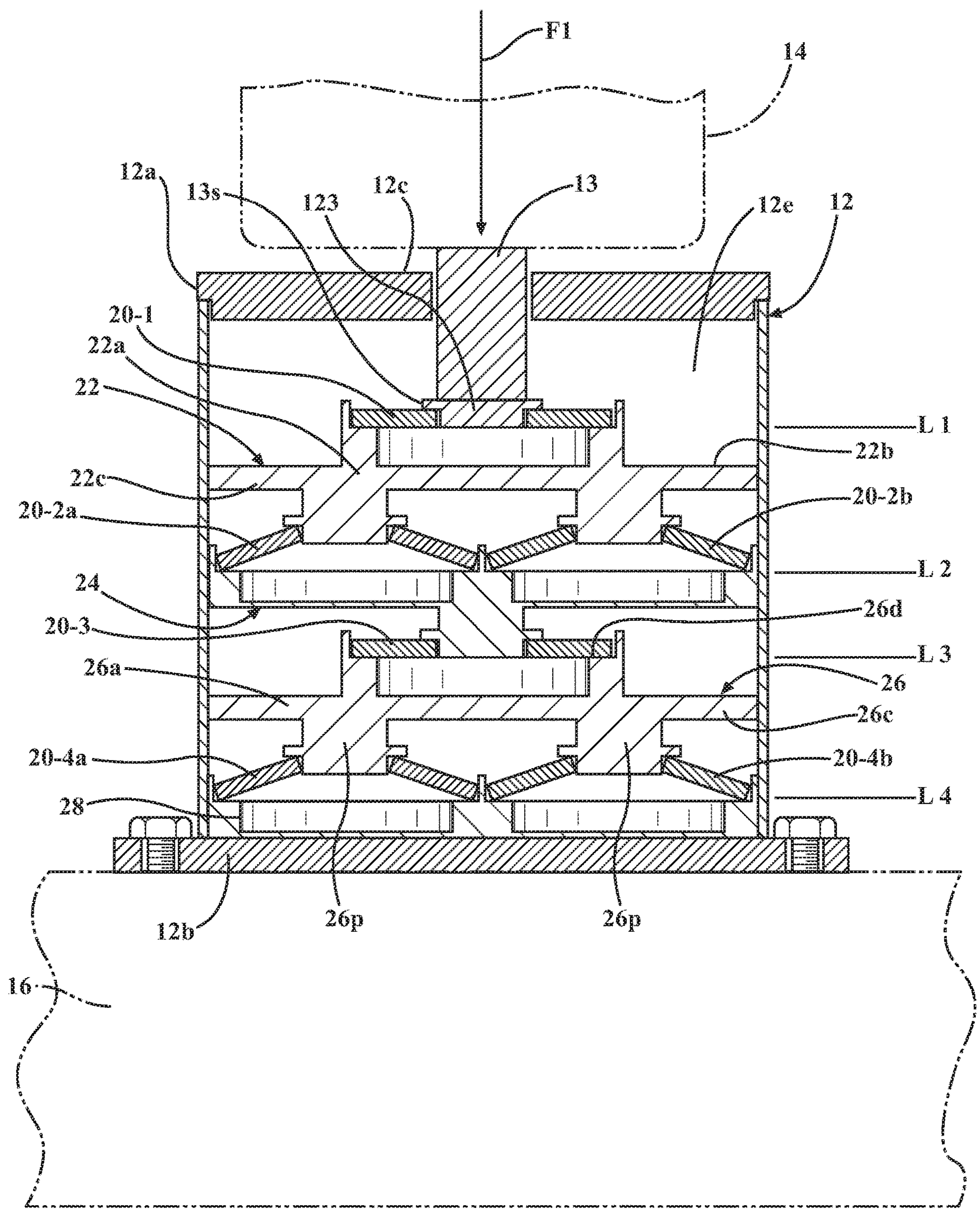
FIG. 4B is a schematic cross-sectional view of the vibration isolator of FIG. 4A, showing the applied load increased to a level sufficient to provide a quasi-zero/negative stiffness response in a portion of the conical disc spring members incorporated into the isolator.
Figure 4C:
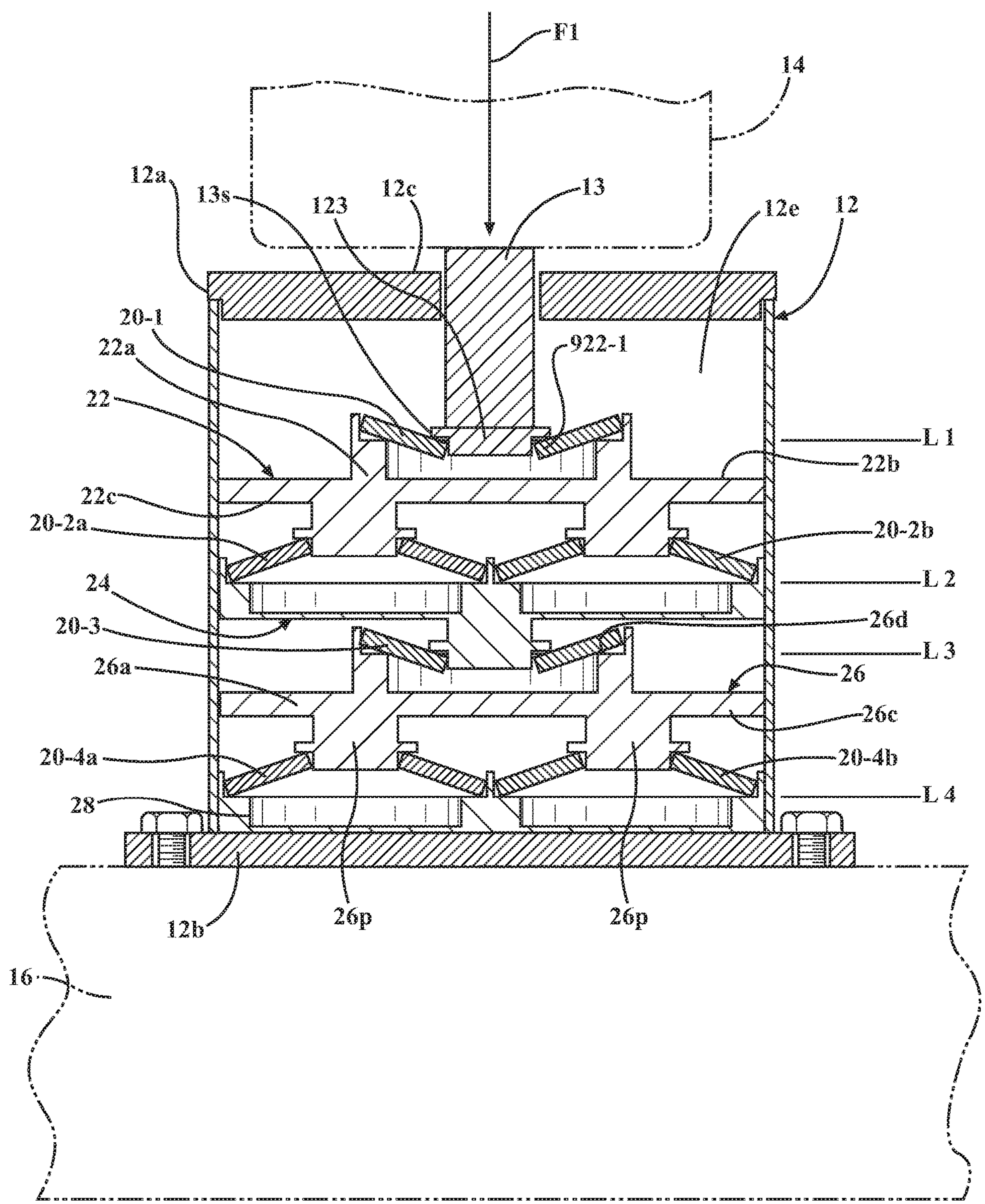
FIG. 4C is a schematic cross-sectional view of the vibration isolator of FIG. 4B, showing a portion of the conical disc spring members in an inverted state after a further increase in the loading applied to the vibration isolator.
Figure 4D:
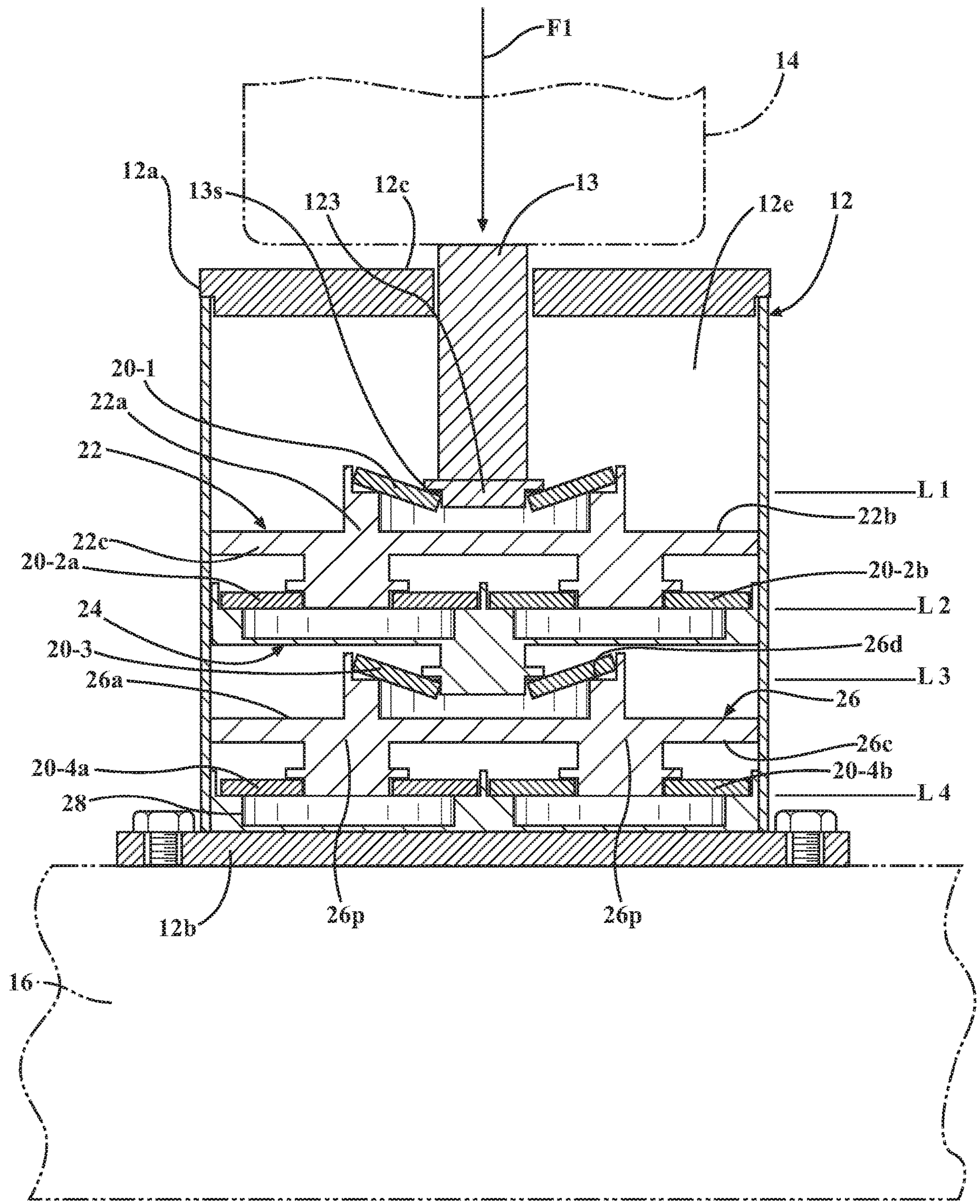
FIG. 4D is a schematic cross-sectional view of the vibration isolator of FIG. 4C, showing the applied load further increased to a level sufficient to provide a quasi-zero/negative stiffness response in another portion of the conical disc spring members incorporated into the isolator.
Figure 4E:
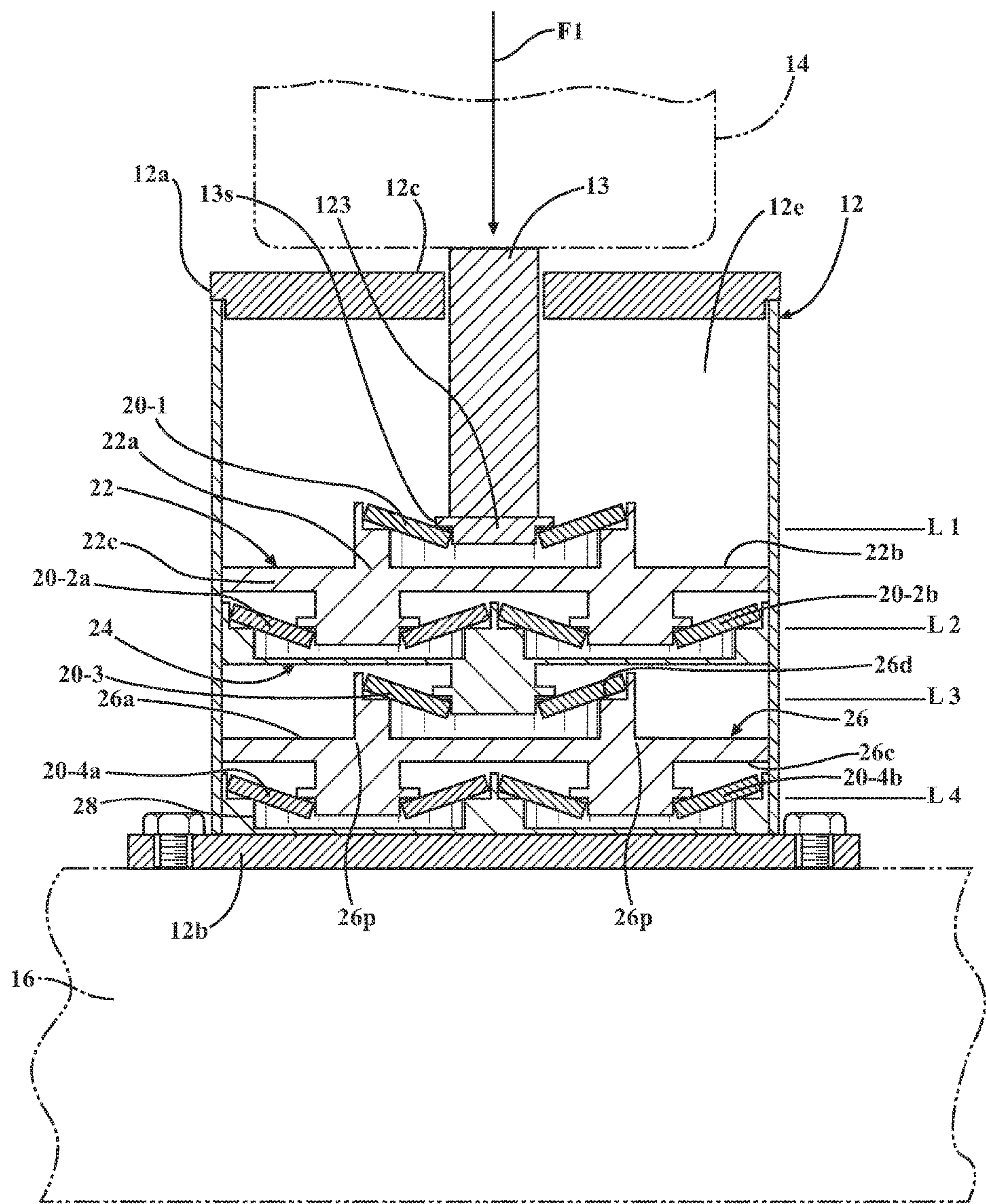
FIG. 4E is a schematic cross-sectional view of the vibration isolator of FIG. 4B, showing the other portion of the conical disc spring members in an inverted state after a further increase in the loading applied to the vibration isolator.

It has also been found that the extent of the quasi-zero/negative stiffness region of a given arrangement of conical disc spring members may be extended or maximized by enabling each conical disc spring member to resiliently invert (as seen in FIGS. 4C-4E) to the greatest degree practicable during loading. It is desirable for the extent of the quasi-zero/negative stiffness region to be as large as possible, to maximize the range of operational loads over which a quasi-zero/negative stiffness response may be achieved. The openings (such as opening 22*f* of first spacer 22, for example) formed in cavity floors of the spacer base portions described herein are designed to permit the conical disc spring members positioned over the openings to invert to greatest degree possible during loading, consistent with resilient deflection of the conical disc spring members. Inversion of a conical disc spring member under load may be defined as a condition as shown in FIG. 4C, for example, in which the force applied to the conical disc spring member is such that at least a portion of a first end of a spring member (such as first end 922-1 of spring member 20-1) resiliently deflects from an unstressed state (as shown in FIG. 1) past a flattened configuration shown in FIG. 4B, to a location below a floor (such as 22*e*) of a spacer supporting the conical disc spring member, and into a cavity 22*d* of the spacer.

Figure 5:
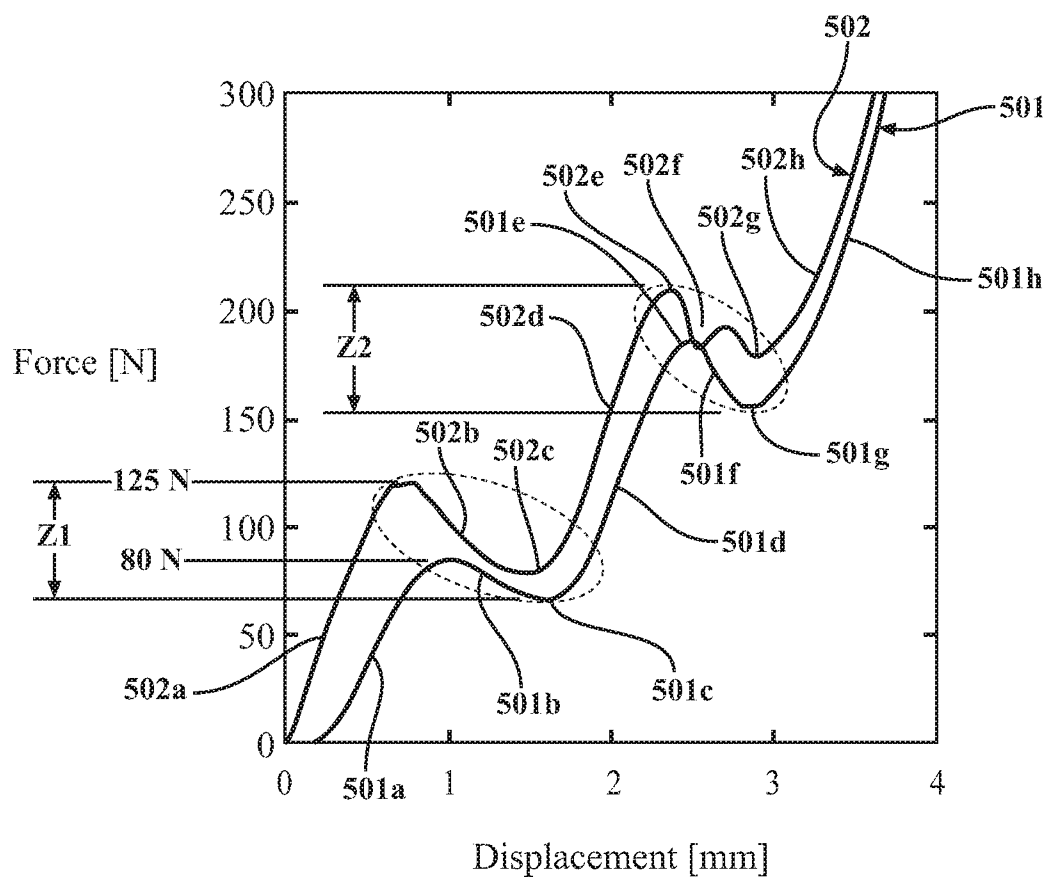
FIG. 5 shows an exemplary force-displacement curve for the conical disc spring member arrangement shown in FIGS. 1 and 4A-4E.

Examples of such an arrangement are shown in FIGS. 4A-4E for the vibration isolator shown in FIG. 1. FIGS. 4A-4E show schematic side cross-sectional views of the vibration isolator embodiment 12 of FIG. 1 incorporating spacers 22, 24, 26, 28 which are designed to enable inversion of the conical disc spring members 20-1 through 20-4*b* coupled to the spacers. FIG. 5 shows an exemplary force-displacement curve for the conical disc spring member arrangement shown in FIGS. 1 and 4A-4E. Behavior of a conical disc spring member arrangement shown in FIGS. 1 and 4A-4E during deflection and inversion of the spring members 20-1 through 20-4*b* will be described with reference to FIGS. 4A-4E and FIG. 5. The exemplary force-displacement curve shown in FIG. 5 is for purposes of illustrating the force-deflection characteristics of the conical disc spring member arrangement shown in FIGS. 1 and 4A-4E. The particular force values and deflection values shown may differ according to the details of particular spring member designs, spacer dimensions, and other factors. However, the curve of FIG. 5 provides a qualitative representation of the force-deflection characteristics which may be obtained from the conical disc spring member arrangement shown in FIGS. 1 and 4A-4E.

In another aspect of the embodiments described herein, it has also been found that, through appropriate configuration of the conical disc spring member arrangements, force deflection curves including multiple "quasi-zero/negative" stiffness regions may be provided. This aspect is also shown in FIG. 5. Referring to FIGS. 1, 4A-4E and 5, it is seen that each of levels L1 and L3 of the vibration isolator includes a single conical disc spring member (20-1 in level 1 and 20-3 in level 3). Levels 2 and 4 each include a pair of conical disc spring members (20-2*a* and 20-2*b* in level 2, and 20-4*a* and 20-4*b* in level 4). In FIG. 5, curve 501 may represent the force-deflection characteristics of the conical disc spring members 20-1, 20-2*a*, and 20-2*b* in levels L1 and L2. Also, curve 502 may represent the force-deflection characteristics of the conical disc spring members 20-3, 20-4*a*, and 20-4*b* in levels L3 and L4.

Referring to FIGS. 4A and 5, when force F1 is applied to the conical disc spring member arrangement shown, a portion of the conical disc spring member arrangement may initially deflect as indicated by portion 501*a* of the curve 501, up to a certain force level (in the example of FIG. 4D, about 125 Newtons). Thus, in the example shown, the quantity $P_{flat}$ is equal to about 125 Newtons. At this force level, a quasi-zero/negative stiffness region 501*b* of the curve 501 is reached, in which each of the conical disc spring members in the arrangement may experience increased deflection with no additional force and/or a drop in force with further deflection. Also, at this point, the conical disc spring members may have been deflected to conditions similar to that shown in FIG. 4B, in which the conical disc spring members are flat or nearly flat. As the force F1 applied to the conical disc spring members 20 continues to increase, an end of the quasi-zero/negative stiffness region 501*b* may be reached at a location 501*c*. After the quasi-zero/negative stiffness region 501*b* is passed, as the applied force F1 increases, the conical disc spring members 20 may continue to resiliently deflect past the flat state as indicated by portion 501*d* of the curve 501, until the conical disc spring members are inverted (i.e., oriented in directions opposite to their initial, unloaded configurations shown in FIG. 4A), as shown in FIG. 4C.

Referring to FIGS. 4A, 4B and 5, when a force F1 is applied to the conical disc spring member arrangement through force application member 13, the conical disc spring member arrangement may initially deflect as indicated by portions 501*a* and 502*a* of the curves 501, 502. The single-spring member levels L1 and L3 may deflect more rapidly that the double-spring member levels L2 and L4, because the applied forces in levels L2 and L4 are divided between two conical disc spring members, rather than one. When a certain force level is reached in conical disc spring member 20-1 (in the particular example shown, about 80 Newtons), the spring member 20-1 may enter a quasi-zero/negative stiffness force-deflection response region 501*b* of the force-deflection curve 501. While the applied force F1 is within this region, conical disc spring member 20-1 may have quasi-zero/negative stiffness force-deflection characteristics as previously described. Similarly, when a certain force level is reached in conical disc spring member 20-3 (in the particular example shown, about 125 Newtons), the spring member 20-3 may enter a quasi-zero/negative stiffness force-deflection response region 502*b* of the force-deflection curve 502. While the applied force F1 is within this region, conical disc spring member 20-3 may have quasi-zero/negative stiffness force-deflection characteristics as previously described.

Although the range of forces over which the conical disc spring member 20-1 exhibits quasi-zero/negative stiffness behavior may not coincide exactly with the range of forces over which the conical disc spring members 20-3 exhibits quasi-zero/negative stiffness behavior, the respective ranges of forces may be close to each other and may overlap, due to the fact that a single conical disc spring member is being loaded in each of levels L1 and L3.

Also, when the forces applied to the conical disc spring members 20-1 and 20-3 are within ranges where quasi-zero/negative stiffness behavior is exhibited, the conical disc spring members 20-1 and 20-3 may have been deflected to conditions similar to that shown in FIG. 4B, in which the conical disc spring members are flat or nearly flat.

In one or more arrangements, for purposes of targeting a level of force F1 to be applied to the vibration isolator to produce the quasi-zero/negative stiffness response (or for purposes of designing a conical disc spring member arrangement which will provide quasi-zero/negative stiffness response for a given applied force), an effective quasi-zero/negative stiffness response zone Z1 may be established. As shown in FIG. 5, the zone Z1 may be bounded by a highest force at which the quasi-zero/negative stiffness response for the single conical disc spring member levels L1 and L3 begins (in this case, about 125 Newtons), and a lowest force at which the quasi-zero/negative stiffness response for the single conical disc spring member in levels L1 and L3 ends (in this case, about 70 Newtons). In one or more arrangements, for conical member spring and system design purposes, a conical disc spring member arrangement as shown in FIGS. 4A-4E and designed in accordance with the principles described herein may be assumed to exhibit quasi-zero/negative stiffness behavior in response to applied forces falling within a range of forces defined in this manner. Thus, a vibration isolator exhibiting quasi-zero/negative stiffness behavior in response to applied forces in zone Z1 may be used in a system where this range of applied forces will be encountered. Alternatively, the location of zone Z1 on the force-deflection curves may be tailored so that the isolator will exhibit quasi-zero/negative stiffness behavior in response to a known, predetermined target range of applied forces. The effective quasi-zero/negative stiffness response zone Z1 may also be defined in an alternative manner.

Referring to FIGS. 4B, 4C, and 5, as the applied force and displacement continue to increase, an end of the quasi-zero/negative stiffness region 501*b* for the conical disc spring member 20-1 may be reached at location 501*c*, and an end of the quasi-zero/negative stiffness region 502*b* for the conical disc spring member 20-3 may be reached at location 502*c*. The conical disc spring members 20-1 and 20-3 may also continue to resiliently deflect as indicated by regions 501*d* and 502*d* of the curves 501 and 502. Within the regions 501*d* and 502*d*, the respective conical disc spring members 20-1 and 20-3 may resiliently deflect to inversion as shown in FIG. 4C.

The base portion openings in the various spacers as previously described herein (such as opening 22-*f* in first spacer 22, for example may be structured or dimensioned so as to permit the first ends of conical disc spring members 20 to resiliently deflect into the openings and invert as shown in FIGS. 4C-4E, without the first ends of the conical disc spring members contacting the associated spacers. This enables maximum resilient deflection of the conical disc spring members 20 during inversion. Thus, the provision of openings in the spacer members enables the conical disc spring members 20 to invert during axial loading of the vibration isolator, thereby providing the energy-absorbing structure with greater resilient deflectability. Also, by permitting the conical disc spring members to invert during applied loading, it is ensured that the conical disc spring members 20-1 and 20-3 will completely pass the quasi-zero/negative stiffness regions 501*b* and 502*b* and reach the portion 501*d* and 502*d* of the curves 501 and 502, thereby ensuring that the extreme upper limit of the quasi-zero/negative stiffness regions 501*b* and 502*b* have been reached and that the entire quasi-zero/negative stiffness regions 501*b* and 502*b* have been utilized during operation of the vibration isolator. This provides the greatest operational flexibility of the vibration isolator during loading.

Referring to FIGS. 4D and 5, as the applied force F1 continues to increase, the conical disc spring members 20-2*a*, 20-2*b* may continue to resiliently deflect as indicated by portion 501*d* of curve 501 until a certain force is reached at location 501*e*, after which the combination of conical disc spring members 20-2*a*, 20-2*b* will exhibit quasi-zero/negative stiffness behaviors along curve region 501*f*. similarly, the conical disc spring members 20-4*a*, and 20-4*b* may continue to resiliently deflect as indicated by portion 502*d* of curve 502 until a certain force is reached at location 502*e*, after which the combination of conical disc spring members 20-4*a*, 20-4*b* will exhibit quasi-zero/negative stiffness behaviors along curve region 502*f*.

Also, when the forces applied to the conical disc spring members 20-2*a*, 20-2*b*, 20-4*a*, and 20-4*b* are within ranges where quasi-zero/negative stiffness behavior is exhibited, the conical disc spring members 20-2*a*, 20-2*b*, 20-4*a*, and 20-4*b* may have been deflected to conditions similar to that shown in FIG. 4D, in which the conical disc spring members are flat or nearly flat. An effective quasi-zero/negative stiffness response zone Z2 may be established in the manner previously described for the portions of the curves 501 and 502 showing quasi-zero/negative stiffness responses for conical disc spring members 20-2*a*, 20-2*b*, 20-4*a*, and 20-4*b*. In the particular example, shown, an upper boundary of the zone Z2 may lie at about 215 Newtons, while a lower boundary of the zone Z2 may lie at about 155 Newtons. The zone Z2 may define (for design purposes) a range of forces over which quasi-zero/negative stiffness response of the will be exhibited by the combination of conical disc spring members 20-2*a*, 20-2*b*, 20-4*a*, and 20-4*b*.

Referring to FIGS. 4D, 4E, and 5, as the applied force and displacement continue to increase, an end of the quasi-zero/negative stiffness region 501*f* for the conical disc spring members 20-2*a* and 20-2*b* may be reached at location 501*g*, and an end of the quasi-zero/negative stiffness region 502*f* for the conical disc spring members 20-4*a* and 20-4*b* may be reached at location 502*g*. The conical disc spring members 20-2*a* and 20-2*b* and 20-4*a* and 20-4*b* may then continue to resiliently deflect as indicated by regions 501*h* and 502*h* of the curves 501 and 502. Along the regions 501*h* and 502*h*, the respective conical disc spring members 20-2*a* and 20-2*b* and 20-4*a* and 20-4*b* may resiliently deflect to inversion as shown in FIG. 4E.

Using the relationships set forth herein, a conical disc spring member arrangement may be designed for an expected axial loading of the vibration isolator (for example, using analytical and/or experimental methods) so that the expected loading occurs within the force or range of forces encompassed by the quasi-zero/negative stiffness region of the vibration isolator, thereby enabling these forces to be isolated or substantially attenuated by the energy-absorbing structure. For example, conical disc spring members and associated spacers may be provided and arranged as shown in FIG. 1. This conical disc spring member arrangement may be tested by applying an axial loading equal to an anticipated operational loading, and the force-deflection results evaluated. The conical disc spring member arrangement may then be modified as desired, for example, by using conical disc spring members having different dimensions and/or by increasing or decreasing the number of conical disc spring members. Alternative arrangements (i.e., series, parallel, or combinations of series and parallel arrangements) of conical disc spring members may also be evaluated. This process may be continued until an optimum conical disc spring member arrangement is obtained which provides a quasi-zero/negative stiffness region at a force level equal or close to the expected loading. However, any conical disc spring members used should be designed or selected in accordance with the guidelines previously discussed, to help ensure that the resulting conical disc spring member arrangement will provide a quasi-zero/negative stiffness region as previously described.

Design parameters affecting the force-deflection curve of a particular conical disc spring member arrangement may include the number of conical disc spring members in the vibration isolator, the dimensions of the conical disc spring members, the spatial arrangement of the conical disc spring members, and other pertinent parameters. Although the drawings show conical disc spring members arranged in a series configuration, other spatial arrangements may be used to vary and adjust the force-deflection characteristics of the conical disc spring member arrangement for a given loading.

In one or more arrangements, instead of dividing the applied force F1 evenly between two conical disc spring members as shown in FIG. 1, the applied force F1 may be split evenly between 3 or more conical disc spring members. For example, a structure in which the applied force F1 is split evenly between three conical disc spring members on the same level may provide a different discrete "quasi-zero/negative" stiffness region which may be activated in the manner just described, at a force of about three times the force at which the "quasi-zero/negative" stiffness region of a single conical disc spring member may be activated. This capability aids in producing a vibration isolator which may provide "quasi-zero/negative" stiffness regions for a variety of applied forces.

Figure 7A:
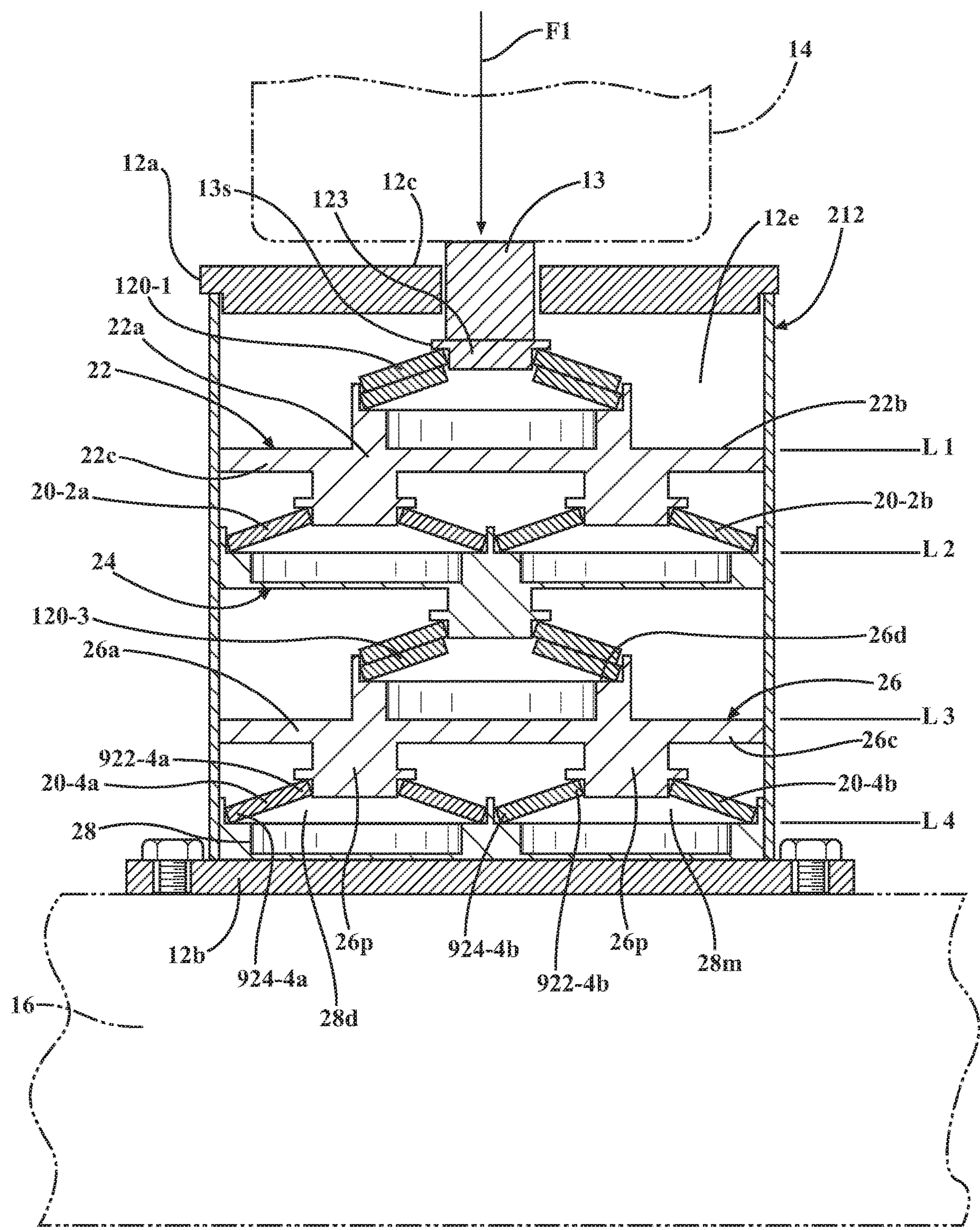
FIG. 7A is a schematic cross-sectional view of a vibration isolator in accordance with another embodiment described herein.
Figure 7B:
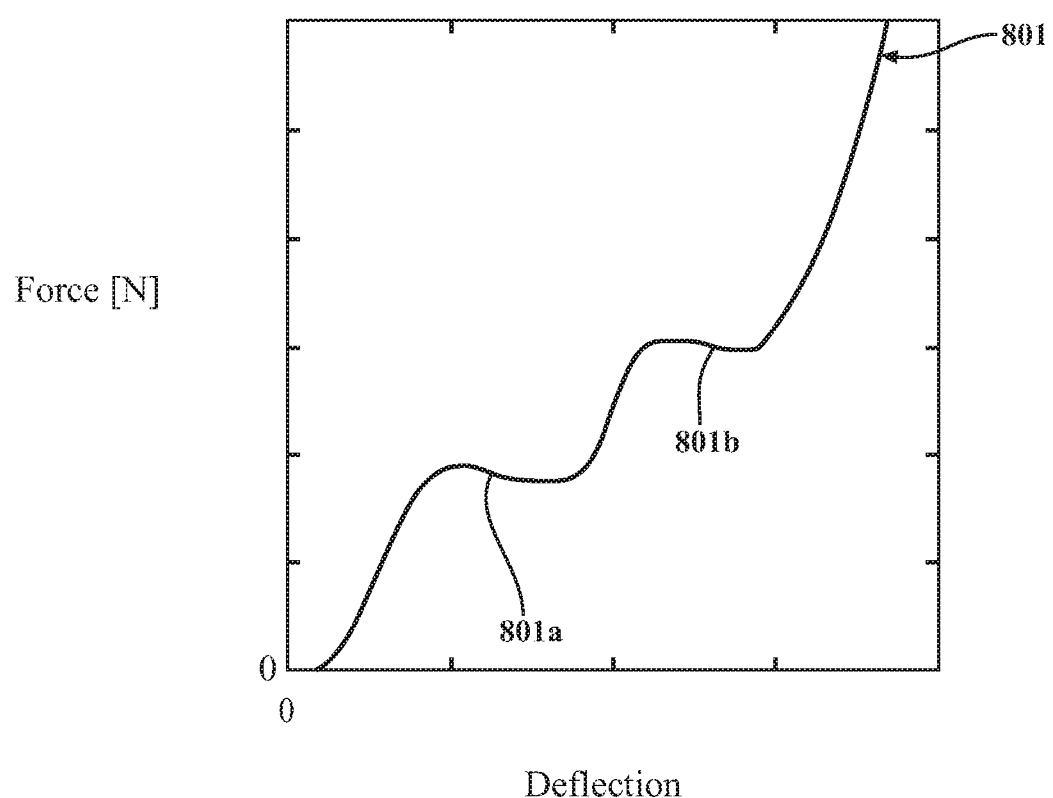
FIG. 7B shows an exemplary force-displacement curve for the conical disc spring member arrangement shown in FIG. 7A.

Referring now to FIGS. 7A and 7B, another embodiment 212 of the vibration isolator is provided. This embodiment may be structured and may function in the same manner as the embodiment 12 shown in FIGS. 1, 4A-4E, and 5, except for the following differences. In vibration isolator 212, an additional conical disc spring member may be stacked upon each conical disc spring member in each level containing only one conical disc spring member. Thus, an additional conical disc spring member 120-1 may be stacked upon conical disc spring member 20-1, in contact and in parallel with conical disc spring member 20-1, and an additional conical disc spring member 120-3 may be stacked upon conical disc spring member 20-3, in contact and in parallel with conical disc spring member 20-3. Conical disc spring members 120-1 and 120-3 may have the same design/dimensions, or different designs and/or dimensions. In the embodiment shown in FIG. 7A, conical disc spring members 120-1 and 120-3 have the same design/dimensions.

Stacking of the additional conical disc spring members in levels L1 and L3 as shown is known to have the effect of adding another spring constant in parallel to a first spring constant (for example, adding the spring constant of conical disc spring member 120-1 to the spring constant of conical disc spring member 20-1), thereby increasing the force necessary to deflect the combined, stacked conical disc spring members in levels L1 and L3. This effect may be combined with the force-deflection response for a pair of side-by-side conical disc spring members (such as spring members 20-2*a* and 20-2*b*) on the same level as previously described. Conical disc spring members 120-1 and 120-3 may be designed or selected so as to have dimensions different from conical disc spring members 20-1 and 20-3.

FIG. 7B is a graph similar to FIG. 5, showing an exemplary force-deflection curve 801 for the combination of conical disc spring members 120-1, 20-1, 20-2*a*, and 20-2*b* of FIG. 7A. Although the total vibration isolator of FIG. 7A may have force-deflection characteristics as shown in FIG. 5, the response of only a portion of the isolator will be described as follows, for purposes of clarity. It will be understood that a force deflection curve for the combination of conical disc spring members 120-3, 20-3, 20-4*a*, and 20-4*b* of FIG. 7A may closely parallel the curve 801 in the same manner that curve 502 of FIG. 5 parallels curve 501 of FIG. 5.

Referring to FIG. 7B, in one or more arrangements, conical disc spring member 120-1 may be designed or selected such that a quasi-zero/negative stiffness region 801*a* of the combined conical disc spring members 20-1 and 120-1 of level L1 is provided which is relatively close to (but below) the quasi-zero/negative stiffness region 801*b* of the combined conical disc spring members 20-2*a* and 20-2*b* of level L2, so that the end of the quasi-zero/negative stiffness region 801*a* of the combined conical disc spring members 20-1 and 120-1 may coincide with (or be closely proximate to) the start of the quasi-zero/negative stiffness region 801*b* of the combined conical disc spring members 20-2*a* and 20-2*b*, as shown in FIG. 7B. Reducing the force gap between the quasi-zero/negative stiffness regions 801*a* and 801*b* may operate to substantially combine the two the quasi-zero/negative stiffness regions, thereby increasing the effective size of the quasi-zero/negative stiffness region experienced by the vibration isolator. This increases the operational flexibility of the vibration isolator by increasing the range of forces over which the vibration isolator will operate in the quasi-zero/negative stiffness region. In this manner, a design may be "tuned" (for example, iteratively by experimentation) to maximize the size of the "quasi-zero/negative" stiffness region. Properties of the conical disc spring member 120-1 may be varied experimentally and the resulting force-deflection curves may be measured, until a desired proximity of the quasi-zero/negative stiffness regions 801*a* to the quasi-zero/negative stiffness regions 801*b* is achieved.

FIGS. 6A-6C are schematic cross-sectional side views of another embodiment 112 of the vibration isolator. Referring to FIGS. 6A-6C, in one or more arrangements, the vibration isolator 112 may include a housing 112*a* having a first end 112*b* and a second end 112*c* positioned opposite the first end

112*b*. At least one wall 112*d* may extend between the first and second ends 112*b*, 112*c*. Each combination of conical disc spring members 20 and spacers 122, 124 inside a housing in a given embodiment of the vibration isolator forms an associated energy-absorbing structure incorporated into the housing. The housing first end 112*b*, second end 112*c*, and the wall(s) 112*d* may combine to define an interior 112*e* of the housing. Housing 112*a* may contain the deflectable and movable components (such as conical disc spring members 20 and spacers 122, 124 described below) forming the various energy-absorbing structures described herein, and provides a structure which is positionable and securable between the first and second elements 16, 14 as previously described to perform the vibration isolation function.

One or more force application members 113 may be coupled to the housing 112*a* so as to be movable with respect to the housing 112*a*. The embodiment of FIGS. 6A-6B has a pair of force application members 113*a* and 113*b*. The force application member(s) 13 may extend from the interior 112*e* of the housing 112*a* to an exterior of the housing 112*a*, for example through associated holes formed in housing second end 112*c*. The force application member(s) 113 may enable forces to be transferred between elements (such as a vehicle seat assembly 14) located exterior of the housing to the energy-absorbing structure located in the housing interior 112*e*. As shown in FIGS. 6A-6C, a force application member 113 may contact a spacer 123 inside the housing. One or more shoulders 123*s* of the spacer 123 may be structured to engage a portion of an associated first conical disc spring member 20-1 adjacent a central opening in a first end of the first conical disc spring member 20-1 as shown in FIGS. 6A-6C, to enable application of a force to a first end of the first conical disc spring member. Forces may be applied to the spacer 123 via force application member 113 to deflect the conical disc spring members 20. The force application member 113 may be a part of the vibration isolator 112, or the force application member 113 may be incorporated into (or in contact with) an element or mechanism to which the vehicle seat assembly 14 and the vibration isolator 112 is attached or coupled.

The vibration isolator 112 may also include a plurality of conical disc spring members, generally designated 20, and structured as previously described with respect to the embodiment shown in FIG. 1. The conical disc spring members 20 may have the same shape and dimensions, or the conical disc spring members 20 may have different shapes and dimensions. The conical disc spring members 20 shown in FIGS. 6A-6C have the same shapes and dimensions. Conical disc spring members 20 in vibration isolator 112 are arranged in a series configuration. As in the embodiment shown in FIG. 1 and as previously described, the conical disc spring members may be positioned at different levels. FIGS. 6A-6C show levels L1-L5, with a pair of conical disc spring members positioned at each level.

Referring to FIGS. 6A-6C, in the embodiment shown, a pair of first conical disc spring members 20-1*a* and 20-1*b* may be positioned in the housing 112*a* at level L1. Each of first conical disc spring members 20-1*a* and 20-1*b* may be coupled to an associated spacer 123 so as to enable transfer of forces between the spacer 123 (in contact with a force application member 113) and the first conical disc spring member. As seen in FIGS. 6A-6C, a portion of a spacer 123 may extend into the central opening 923 of an associated first conical disc spring member. This arrangement may aid in maintaining alignment between the first conical disc spring member 20-1 and the spacer during loading.

As in the previously described embodiments, a spacer may be interposed between each two adjacent conical disc spring members on different levels. The spacer may be structured to engage each of the adjacent conical disc spring members so as to maintain a predetermined spacing between portions of the adjacent conical disc spring members during loading of the conical disc spring members. In the manner described herein, use of the spacer may also increase the deflection which may be achieved by the vibration isolator energy-absorbing structure during loading, by providing space for the conical disc spring members in contact with the spacer to flatten and invert under loading, as shown in FIGS. 6B and 6C and as previously described.

Referring to FIGS. 6A-6C, at least one first spacer 122-1 may be positioned in the housing interior 112*e*. FIGS. 6A-6C show a pair of first spacers 122-1 and 122-2 positioned in housing 112*a*. Each of first spacers 122-1 and 122-2 has the same configuration. Thus, the description of spacer 122-1 set forth herein will also apply to spacer 122-2 and any other similarly configured spacers that may be incorporated into an embodiment of the vibration isolator. The first spacer 122-1 may have a base portion 122-1*a* with a first side 122-1*b* and a second side 122-1*c* opposite the first side 122-1*b*. The first spacer 122-1 may be coupled to first conical disc spring members 20-1*a* and 20-1*b* along the first spacer base portion first side 122-1*b* so as to enable transfer of forces between first conical disc spring members 20-1 and 20-1*a* and 20-1*b* the first spacer 122-1. Cavities formed in the spacers shown in FIGS. 6A-6C may have the same structure as spacer embodiments shown in FIG. 1. The base portion first side 122-1*b* may define a cavity 122-1*d* structured to receive therein a second end 924-1*a* of first conical disc spring member 20-1*a*. The cavity 122-1*d* may have a cavity floor 122-1*e*. In the embodiment shown, first cavity 122-1*d* is formed by first cavity floor 122-1*e* and one or more walls 122*g* extending from the base portion 122*a*. The second end 924-1*a* of the first conical disc spring member 20-1 may be positioned in contact with the first cavity floor 122-1*e*. The first cavity floor 122-1*e* may also have a first opening 122-1*f* formed therein and positioned so as to reside opposite a first end 922-1*a* of the first conical disc spring member 20-1 when the second end 924-1*a* of the first conical disc spring member 20-1 is in contact with the first cavity floor 122-1*e*. The first opening 122-1*f* may be structured to receive at least a portion of the first end 922-1 of the first conical disc spring member 20-1 therein during an inversion of the first conical disc spring member 20-1 occurring during loading of the first conical disc spring member, as shown in FIG. 6C and as described herein. The opening 122-1*f* may lead into a through hole as shown in FIG. 6A, or the opening may lead into a blind hole cavity extending into the base portion 122-1*a* to a depth sufficient to enable a conical disc spring member 20 to deflect into the opening and invert without contacting a bottom of the cavity.

As the second end 924-1 of the conical disc spring member 20-1 (and also the second ends of the other conical disc spring members) deflect radially inwardly and outwardly responsive to an axial loading applied to the vibration isolator, the second ends 924 and outer edges 925 of the conical disc spring members 20 may slide radially inwardly and outwardly along the surfaces (such as floor 122-1*e*) of the spacers with which they are in contact. The first spacer base portion 122-1*a* may also include an outer edge 122-1*h* structured to be slidable along and with respect to housing wall(s) 112*d* during movement of the first spacer 122-1 within the housing 112*a* responsive to loading of the conical disc spring members. The base portion first side may also include another cavity 122-1*x* structured the same as cavity 122-1*d* just described, and which may receive therein conical disc spring member 20-1*b*. Conical disc spring member 20-1*b* may reside in cavity 122-1*x* (and may operate in cavity 122-1*x*) the same manner as described for conical disc spring member 20-2*a*. The other cavity 122-1*x* may be formed by walls 122*g* extending from the base portion 122-1*a*. Other cavity 122-1*x* may be positioned coplanar with or on the same level L1 as first cavity 122-1*d*, and may be spaced apart from the first cavity 122-1*d* by one of walls 122*g*.

The base portion second side 122-1*c* may define another cavity 122-1*j* structured to receive therein a second end 924-2*a* of second conical disc spring member 20-2*a*. The second cavity 122-1*j* may have a second cavity floor 122-1*k*. In the embodiment shown, second cavity 122-1*j* is formed by second cavity floor 122-1*k* and one or more walls 122-1*n* extending from the base portion 122-1*a* along base portion second side 122-1*c*. The second end 924-2*a* of the second conical disc spring member 20-2*a* may be positioned in contact with the second cavity floor 122-1*k*. The second cavity floor 122-1*k* may also have a second opening 122-1*m* formed therein and positioned so as to reside opposite a first end 922-2*a* of the second conical disc spring member 20-2*a* when the second end 924-2*a* of the second conical disc spring member 20-2*a* is in contact with the second cavity floor 122-1*k*. The second opening 122-1*m* may be structured to receive at least a portion of a first end 922-2*a* of the second conical disc spring member 20-2*a* therein during an inversion of the second conical disc spring member 20-2*a* occurring during loading of the second conical disc spring member, as described herein. The second opening 122-1*m* may lead into a through hole as shown in FIGS. 6A-6C, or the opening may lead into a blind hole cavity extending into the base portion to a depth sufficient to enable a conical disc spring member to deflect into the opening without contacting a bottom of the cavity.

Second conical disc spring member 20-2*a* may be coupled to the first spacer 122-1 along the first spacer base portion second side 122-1*c* so as to enable transfer of a force between the first spacer 122-1 and the second conical disc spring member 20-2*a*. The second conical disc spring member 20-2*a* may be coupled to the first spacer 122-1 along the first spacer base portion second side 122-1*c* in the same manner as the first conical disc spring member 20-1*a* is coupled to the first spacer 122-1 along the first spacer base portion first side 122-1*b*, as previously described.

The base portion second side 122-1*c* may also include another cavity 122-1*y* structured the same as cavity 122-1*j* just described, and which may receive therein conical disc spring member 20-2*b*. Conical disc spring member 20-2*b* may reside in cavity 122-1*y* (and may operate in cavity 122-1*y*) in the same manner as described for conical disc spring member 20-2*a*. The other cavity 122-1*y* may be formed by walls 122*g* extending from the base portion 122-1*a*. Other cavity 122-1*y* may be positioned coplanar with or on the same level L2 as cavity 122-1*j*, and may be spaced apart from the cavity 122-1*j* by one of walls 122*g*. First spacer 122-2 may have the same design as spacer 122-1. In addition, the arrangement of conical disc spring members 20-3*a*, 20-3*b*, 20-4*a*, 20-4*b*, and first spacer 122-2 may be the same as that just described for conical disc spring members 20-1*a*, 20-2*a*, 20-2*a*, 20-2*b* and first spacer 122-1, and will not be repeated here.

Referring to FIGS. 6A-6C, at least one second spacer 124 may be positioned in the housing interior 112*e*. FIG. 1 shows four second spacers 124-1 through 124-4 positioned in housing 112*a*. The second spacer 124-1 may be coupled to each of conical disc spring members 20-2*a* and 20-3*a* at first ends of the conical disc spring members so as to enable transfer of forces between the conical disc spring members 20-2*a* and 20-3*a* and the second spacer 124-1. Second spacer 124-1 may be structured to engage the first end 922-2*a* of conical disc spring member 20-2*a* to enable application of a force to the conical disc spring member tending to deflect the first end 922-2*a* of the conical disc spring member 20-2*a* toward the second end 924-2*a* of the conical disc spring member 20-2*a*. The second spacer 124-1 may also be structured to engage the first end 922-3*a* of conical disc spring member 20-3*a* to enable application of a force to the conical disc spring member 20-3*a* tending to deflect the first end 922-3*a* of this conical disc spring member toward the second end 924-3*a* of the conical disc spring member 20-3*a*.

In one or more arrangements, each second spacer 124 may include one or more shoulders structured to engage a portion of an associated conical disc spring member as shown. For example, second spacer 124-1 may include one or more shoulders 124-1*s* structured to engage a portion of conical disc spring member 20-2*a* as shown, adjacent a central opening 923-2*a* formed in the first end of 922-2*a* the spring member 20-2*a*. Shoulder(s) 124-1*s* may also be structured to engage a portion of conical disc spring member 20-3*a* as shown, adjacent a central opening 923-3*a* formed in the first end of 922-3*a* the spring member 20-3*a*. Second spacers 124-2 through 124-4 may be structured the same as second spacer 124-1, and may engage associated adjacent conical disc spring members on different levels in a similar manner so as to enable transmission of forces between the adjacent conical disc spring members on different levels.

An end spacer 126 may be positioned in contact with housing first end 112*b* as shown. End spacer 126 may have a base portion 126*a* and a first side 126*b* similar in structure to a side (such as first side 122-1*b* of first spacer 122-1) of one of spacers 112-1 and 112-2. First side 126*b* may include openings 126*f* and 126*g* structured as previously described, to enable conical disc spring members 20-5*a* and 20-5*b* to invert into the openings as previously described.

Although each of the embodiments described herein shows a certain number of conical disc spring members and spacers alternately arranged in a housing, in other embodiments any desired number of conical disc spring members and spacers may be positioned in the housing, in any arrangement necessary to provide desired force-deflection characteristics or a magnitude of system deflectability for a particular application.

Figure 6D:
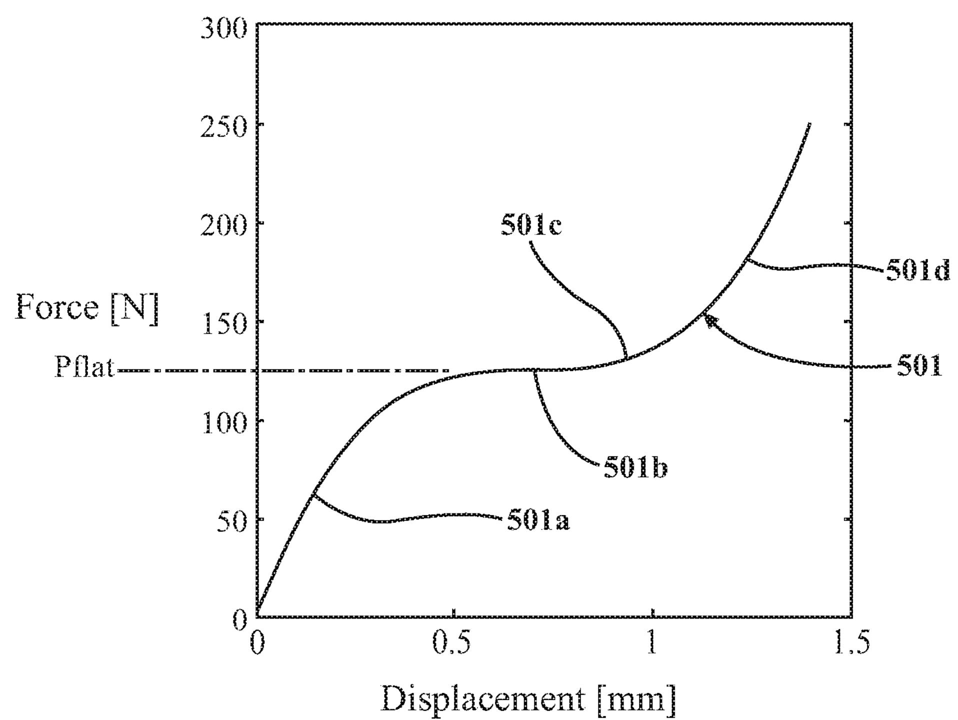
FIG. 6D shows an exemplary force-displacement curve for the conical disc spring member arrangement shown in FIGS. 6A-6C.

FIG. 6D shows an exemplary force-displacement curve for the conical disc spring member arrangement shown in FIGS. 6A-6C. Behavior of a conical disc spring member arrangement shown in FIG. 1 during deflection and inversion of the conical disc spring members 20-1*a* through 20-5*b* will be described with reference to FIGS. 6A-6D. The exemplary force-displacement curve shown in FIG. 6D is for purposes of illustrating the force-deflection characteristics of the conical disc spring member arrangement shown in FIGS. 6A-6C. The particular force values and deflection values shown may differ according to the details of particular spring member designs, spacer dimensions, and other factors. However, the curve of FIG. 6D provides a qualitative representation of the force-deflection characteristics which may be obtained from the conical disc spring member arrangement shown in FIGS. 6A-6C.

FIG. 6A shows a force F1 applied to the vibration isolator 112 so as to deflect conical disc spring members 20-1*a* through 20-5*b*. As stated previously, conical disc spring members 20-1*a* through 20-5*b* incorporated into the vibration isolator 112 all have the same design/dimensions. Curve 501 of FIG. 6D is a representative force-deflection curve for the conical disc spring member arrangement of vibration isolator 112 during application of the force F1. Forces may be applied to the vibration isolator by movement of the housing 112*a* relative to the force application member(s) 113 and/or by movement of force application member(s) 113 relative to housing 112*a*. Forces applied to the vibration isolator via a relative movement of the housing 112*a* may cause reaction forces to be generated at force application member(s) 113.

Referring to FIGS. 6A and 6D, when force F1 is applied to the conical disc spring member arrangement shown, the conical disc spring member arrangement may initially deflect as indicated by portion 501*a* of the curve 501, up to a certain force level (in the example of FIG. 6D, about 125 Newtons). Thus, in the example shown, the quantity $P_{flat}$ is equal to about 125 Newtons. At this force level, a quasi-zero/negative stiffness region 501*b* of the curve 501 is reached, in which each of the conical disc spring members in the arrangement may experience increased deflection with no additional force and/or a drop in force with further deflection. Also, at this point, the conical disc spring members may have been deflected to conditions similar to that shown in FIG. 6B, in which the conical disc spring members are flat or nearly flat. As the force F1 applied to the conical disc spring members continues to increase, an end of the quasi-zero/negative stiffness region 501*b* may be reached at a location 501*c*. After the quasi-zero/negative stiffness region 501*b* is passed, as the applied force F1 increases, the conical disc spring members 20-1*a* through 20-5*b* may continue to resiliently deflect past the flat state as indicated by portion 501*d* of the curve 501, until the conical disc spring members are inverted (i.e., oriented in directions opposite to their initial, unloaded configurations shown in FIG. 6A), as shown in FIG. 6C.

All of the openings in the spacers located opposite the first ends of the conical disc spring members are structured to enable inversion of associated ones of the conical disc spring members and to receive the first ends of the conical disc spring members, in the manner previously described. The base portion openings (such as opening 122-1*f* in first spacer 122, for example) may be structured or dimensioned so as to permit the first ends of conical disc spring members 20-1*a* through 20-5*b* to resiliently deflect into the openings and invert without the first ends of the conical disc spring members contacting the associated spacers. This enables maximum resilient deflection of the conical disc spring members 20-1*a* through 20-5*b* during inversion. Thus, the provision of openings in the spacer members enables the conical disc spring members 20-1*a* through 20-5*b* to invert during axial loading of the vibration isolator, thereby providing the energy-absorbing structure with greater resilient deflectability. Also, by permitting the conical disc spring members to invert during applied loading, it is ensured that the conical disc spring members will reach the portion 501*d* of the curve, thereby ensuring that the extreme upper limit of the quasi-zero/negative stiffness region 501*b* has been reached and that the entire quasi-zero/negative stiffness region 501*b* has been utilized during operation of the vibration isolator. This provides the greatest operational flexibility of the vibration isolator during loading.

Because the forces applied to the conical disc spring members are split between two identical conical disc spring members at each level L1-L5 of the conical disc spring members, the forces acting on each conical disc spring member should be approximately equal. Thus, the quasi-zero/negative stiffness regions of all the conical disc spring members should reside at approximately the same force. This effect acts to provide a single quasi-zero/negative stiffness region for the entire vibration isolator, as shown in FIG. 6D.

In the preceding detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The various elements of the vibration isolator embodiments described herein may be formed from any material or materials suitable for the purposes described. For example, the conical spring disc members may be formed from a metallic material such as a steel, or any other suitable material. In one or more arrangements, the spacers are formed from a polymer material.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An energy-absorbing structure for a vibration isolator comprising:

a first conical disc spring member having a first end including a central opening of the first conical disc spring member, and a second end opposite the first end, the first conical disc spring member also having a central axis;

at least one first spacer including a base portion having a first side, the at least one first spacer base portion first side defining a first cavity structured to receive therein the second end of the first conical disc spring member, the first cavity having a first cavity floor, the second end of the first conical disc spring member being positioned in contact with the first cavity floor, the first cavity floor including a first opening formed therein and positioned so as to reside opposite the first end of the first conical disc spring member when the second end of the first conical disc spring member is positioned in contact with the first cavity floor, the first opening being structured to receive at least a portion of the first end of the first conical disc spring member therein during an inversion of the first conical disc spring member during loading of the first conical disc spring member; and a second conical disc spring member, the second conical disc spring member having a first end including a central opening of the second conical disc spring member, and a second end opposite the first end, the second conical disc spring member also having a central axis, wherein the at least one first spacer base portion first side also defines a second cavity structured to receive therein the second end of the second conical disc spring member, the second cavity having a second cavity floor, the second end of the second conical disc spring member being positioned in contact with the second cavity floor, the second cavity floor including a second opening formed therein and positioned so as to reside opposite the first end of the second conical disc spring member when the second end of the second conical disc spring member is received in the second cavity, the second opening being structured to receive at least a portion of the first end of the second conical disc spring member therein during an inversion of the second conical disc spring member during loading of the second conical disc spring member.

2. The energy-absorbing structure of claim 1 further comprising a third conical disc spring member having a first end including a central opening of the third conical disc spring member, and a second end opposite the first end, the third conical disc spring member also having a central axis, wherein the at least one first spacer base portion includes a second side opposite the first side, wherein the at least one first base portion second side defines a third cavity structured to receive therein the second end of the third conical disc spring member, the third cavity having a third cavity floor, the second end of the third conical disc spring member being positioned in contact with the third cavity floor, the third cavity floor including a third opening formed therein and positioned so as to reside opposite the first end of the third conical disc spring member when the second end of the third conical disc spring member is received in the third cavity, the third opening being structured to receive at least a portion of the first end of the third conical disc spring member therein during an inversion of the third conical disc spring member during loading of the first conical disc spring member.

3. The energy-absorbing structure of claim 2 further comprising at least one second spacer structured to engage the first end of the third conical disc spring member to enable application of a force to the third conical disc spring member tending to deflect the one of the first end and the second end of the third conical disc spring member toward the other one of the first end and the second end of the third conical disc spring member, the at least one second spacer also being structured to engage a first end of another conical disc spring member to enable application of a force to the other conical disc spring member tending to deflect one of the first end and a second end of the other conical disc spring member toward the other one of the first end and the second end of the other conical disc spring member.

4. The energy-absorbing structure of claim 2 wherein the third cavity is positioned on the second side of the at least one first spacer base portion directly opposite one of the first cavity and the second cavity.

5. The energy-absorbing structure of claim 2 further comprising a fourth conical disc spring member having a first end including a central opening of the fourth conical disc spring member, and a second end opposite the first end, the fourth conical disc spring member also having a central axis, wherein the at least one first base portion second side defines a fourth cavity structured to receive therein the second end of the fourth conical disc spring member, the fourth cavity having a fourth cavity floor, the second end of the fourth conical disc spring member being positioned in contact with the fourth cavity floor, the fourth cavity floor including a fourth opening formed therein and positioned so as to reside opposite a first end of the fourth conical disc spring member when the second end of the fourth conical disc spring member is received in the fourth cavity, the fourth opening being structured to receive at least a portion of the first end of the fourth conical disc spring member therein during an inversion of the fourth conical disc spring member during loading of the first conical disc spring member.

6. The energy-absorbing structure of claim 1 further comprising at least one projection extending from the at least one first spacer base portion, the at least one projection including at least one shoulder extending therefrom, the at least one shoulder being structured to engage a portion of another conical disc spring member adjacent a central opening of the other conical disc spring member, to enable application of a force to a first end of the other conical disc spring member using the at least one projection.

7. The energy-absorbing structure of claim 1 further comprising another conical disc spring member positioned in parallel with the first conical disc spring member, and wherein surfaces of the first conical disc spring member and the other conical disc spring member are in physical contact with each other.

8. A vibration isolator comprising a spacer having a base portion with a first side and a second side opposite the first side, the base portion first side including at least one cavity structured to receive therein a portion of a first conical disc spring member and at least one projection extending from the second side and structured to engage a portion of a second conical disc spring member so that a central axis of the first conical disc spring member is non-coaxial with a central axis of the second conical disc spring member when the portion of the first conical disc spring member is received in the at least one cavity and the portion of the second conical disc spring member is engaged with the at least one projection.

9. The vibration isolator of claim 8 further comprising a plurality of projections extending from the base portion second side, each projection of the plurality of projections being structured to engage a portion of a portion of an associated second conical disc spring member so that a central axis of the associated second conical disc spring member is non-coaxial with the central axis of the first conical disc spring member.

10. The vibration isolator of claim 9 wherein a number of projections extending from the base portion second side is greater than a number of cavities included in the base portion first side.

11. The vibration isolator of claim 8 wherein the base portion first side includes a plurality of cavities, each cavity of the plurality of cavities being structured to receive therein a portion of an associated first conical disc spring member so that a central axis of the associated first conical disc spring member is non-coaxial with the central axis of the second conical disc spring member.

12. The vibration isolator of claim 11 wherein a number of projections extending from the base portion second side is less than a number of cavities included in the base portion first side.

13. A vibration isolator comprising:

a housing including a first end and at least one force application member coupled to the housing so as to be movable with respect to the housing, the at least one force application member extending from an interior of the housing to an exterior of the housing;

at least one first conical disc spring member positioned in the interior of the housing and coupled to the at least one force application member so as to enable transfer of a force between the at least one force application member and the at least one first conical disc spring member;

a spacer positioned in the housing interior, the spacer being coupled to the at least one first conical disc spring member so as to enable transfer of a force between the at least one first conical disc spring member and the spacer;

at least one second conical disc spring member positioned in the housing interior and coupled to the spacer so as to enable transfer of a force between the spacer and the at least one second conical disc spring member;

a first additional spacer positioned in the housing interior, the first additional spacer being coupled to the at least one second conical disc spring member along a side of the first additional spacer so as to enable transfer of a force between the at least one second conical disc spring member and the first additional spacer; and at least one third conical disc spring member positioned in the interior of the housing and coupled to the first additional spacer along the side of the first additional spacer so as to enable transfer of a force between the first additional spacer and the at least one third conical disc spring member.

14. The vibration isolator of claim 13 further comprising:

a second additional spacer positioned in the housing interior, the second additional spacer being coupled to the at least one third conical disc spring member so as to enable transfer of a force between the second additional spacer and the at least one third conical disc spring member;

at least one fourth conical disc spring member positioned in the housing interior and coupled to the second additional spacer so as to enable transfer of a force between the second additional spacer and the at least one fourth conical disc spring member; and a third additional spacer positioned in the housing interior, the third additional spacer being coupled to the at least one fourth conical disc spring member so as to enable transfer of a force between the third additional spacer and the at least one fourth conical disc spring member.

15. The vibration isolator of claim 14 wherein a number of third conical disc spring members is equal to a number of first conical disc spring members, and a number of fourth conical disc spring members is equal to a number of second conical disc spring members.

16. The vibration isolator of claim 13 wherein a wherein a number of second conical disc spring members is equal to a number of first conical disc spring members.

* * * * *